(12) United States Patent
Kim

(10) Patent No.: US 11,458,972 B2
(45) Date of Patent: Oct. 4, 2022

(54) VEHICLE CONTROL APPARATUS

(71) Applicant: LG ELECTRONICS INC., Seoul (KR)

(72) Inventor: Taehyun Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 390 days.

(21) Appl. No.: 16/494,726

(22) PCT Filed: May 29, 2019

(86) PCT No.: PCT/KR2019/006446
§ 371 (c)(1),
(2) Date: Sep. 16, 2019

(87) PCT Pub. No.: WO2020/241922
PCT Pub. Date: Dec. 3, 2020

(65) Prior Publication Data
US 2021/0331677 A1  Oct. 28, 2021

(51) Int. Cl.
*B60W 30/18* (2012.01)
*B60W 10/04* (2006.01)
(Continued)

(52) U.S. Cl.
CPC ...... *B60W 30/18009* (2013.01); *B60W 10/04* (2013.01); *B60W 10/18* (2013.01);
(Continued)

(58) Field of Classification Search
None
See application file for complete search history.

(56) References Cited

U.S. PATENT DOCUMENTS 8,010,252 B2 * 8/2011 Getman .......... G01S 15/931
701/78
10,821,968 B2 * 11/2020 Cho .................. B60W 10/18
(Continued)

FOREIGN PATENT DOCUMENTS

KR  1020140073976  6/2014
KR  1020160050736  5/2016
KR  1020190004067  1/2019

OTHER PUBLICATIONS

PCT International Application No. PCT/KR2019/006446, Written Opinion of the International Searching Authority dated Feb. 27, 2020, 9 pages.

*Primary Examiner* — Aniss Chad
*Assistant Examiner* — Mahmoud M Kazimi
(74) *Attorney, Agent, or Firm* — Lee, Hong, Degerman, Kang & Waimey PC

(57) ABSTRACT

A vehicle control apparatus is disclosed. The vehicle control apparatus includes a distance sensor configured to sense a distance from a speed bump, a speed sensor configured to sense a speed of a vehicle, a vehicle driver configured to control an operation of a brake or an operation of an accelerator, and a processor configured to provide an input parameter comprising a speed and a weight of the vehicle to a prediction model and control the vehicle driver so that the brake is operated at a braking intensity outputted from the prediction model when the vehicle enters the speed bump on the basis of the distance from the speed bump.

10 Claims, 9 Drawing Sheets

(51) Int. Cl.
  *B60W 40/10* (2012.01)
  *G06N 3/04* (2006.01)
  *G06N 3/08* (2006.01)
  *B60W 50/00* (2006.01)
  *B60W 10/18* (2012.01)

(52) U.S. Cl.
  CPC ........... *B60W 40/10* (2013.01); *G06N 3/0454* (2013.01); *G06N 3/08* (2013.01); *B60W 2510/22* (2013.01); *B60W 2552/35* (2020.02); *B60W 2710/182* (2013.01)

(56) References Cited

U.S. PATENT DOCUMENTS

| | | | |
|---|---|---|---|
| 2004/0162644 A1* | 8/2004 | Torii | G05D 1/0825 701/1 |
| 2011/0257860 A1 | 10/2011 | Getman et al. | |
| 2014/0163836 A1* | 6/2014 | Um | B60W 30/143 701/93 |
| 2019/0001965 A1 | 1/2019 | Cho et al. | |
| 2019/0384273 A1* | 12/2019 | Han | G06N 3/08 |

\* cited by examiner (a)

(b)

(c)

(a)

(b)

(c)

(a)

(b)

810

VEHICLE CONTROL APPARATUS

CROSS-REFERENCE TO RELATED APPLICATIONS

This application is the National Stage filing under 35 U.S.C. 371 of International Application No. PCT/KR2019/006446, filed on May 29, 2019, the contents of which are hereby incorporated by reference herein in its entirety.

TECHNICAL FIELD

The present invention relates to a vehicle control apparatus, which is capable of reducing sloshing of a vehicle by moving a load of the vehicle forward or backward through control of an accelerator or a brake.

BACKGROUND ART

Artificial intelligence is a field of computer engineering and information technology involving studying how computers can think, learn and self-develop in ways similar to human intelligence, and means that computers can emulate intelligent actions of humans.

In addition, artificial intelligence does not exist by itself but is directly or indirectly associated with the other fields of computer science. In particular, many attempts have been made to introduce elements of artificial intelligence into various fields of information technology.

Meanwhile, techniques for recognizing and learning surrounding situations by using artificial intelligence, providing information desired by the user in a desired form, or performing a desired operation or function are being actively studied.

There is a speed bump on the road. When the vehicle passes through the speed bump, sloshing (up and down movement) due to the speed bump occurs. The speed bump is essential for the safety of pedestrians, but is a factor that may reduce the riding comfort of the vehicle driver.

Meanwhile, the conventional vehicle control apparatus merely informs that the speed bump exists to the user through a navigation.

Thus, the reduction of the sloshing of the vehicle through the speed bump is entirely dependent on the driver's judgment and brake/accelerator control. Thus, the ride comfort may be deteriorated, and if the speed is not reduced, there is a problem that a load is applied to the vehicle.

DISCLOSURE OF THE INVENTION

Technical Problem

To solve the above problem, the present invention relates to a vehicle control apparatus, which is capable of reducing sloshing of a vehicle by moving a load of the vehicle forward or backward through control of an accelerator or a brake.

Technical Solution

A vehicle control apparatus according to an embodiment of the present invention includes a distance sensor configured to sense a distance from a speed bump, a speed sensor configured to sense a speed of a vehicle, a vehicle driver configured to control an operation of a brake or an operation of an accelerator, and a processor configured to provide an input parameter including a speed and a weight of the vehicle to a prediction model and control the vehicle driver so that the brake is operated at a braking intensity outputted from the prediction model when the vehicle enters the speed bump on the basis of the distance from the speed bump.

Advantageous Effects

According to the present invention, the optimum braking intensity that is capable of minimizing the sloshing of the vehicle may be calculated based on the vehicle speed and the vehicle weight to minimize the sloshing of the vehicle and provide the comfortable ride to the occupants.

MODE FOR CARRYING OUT THE INVENTION

Figure 1:
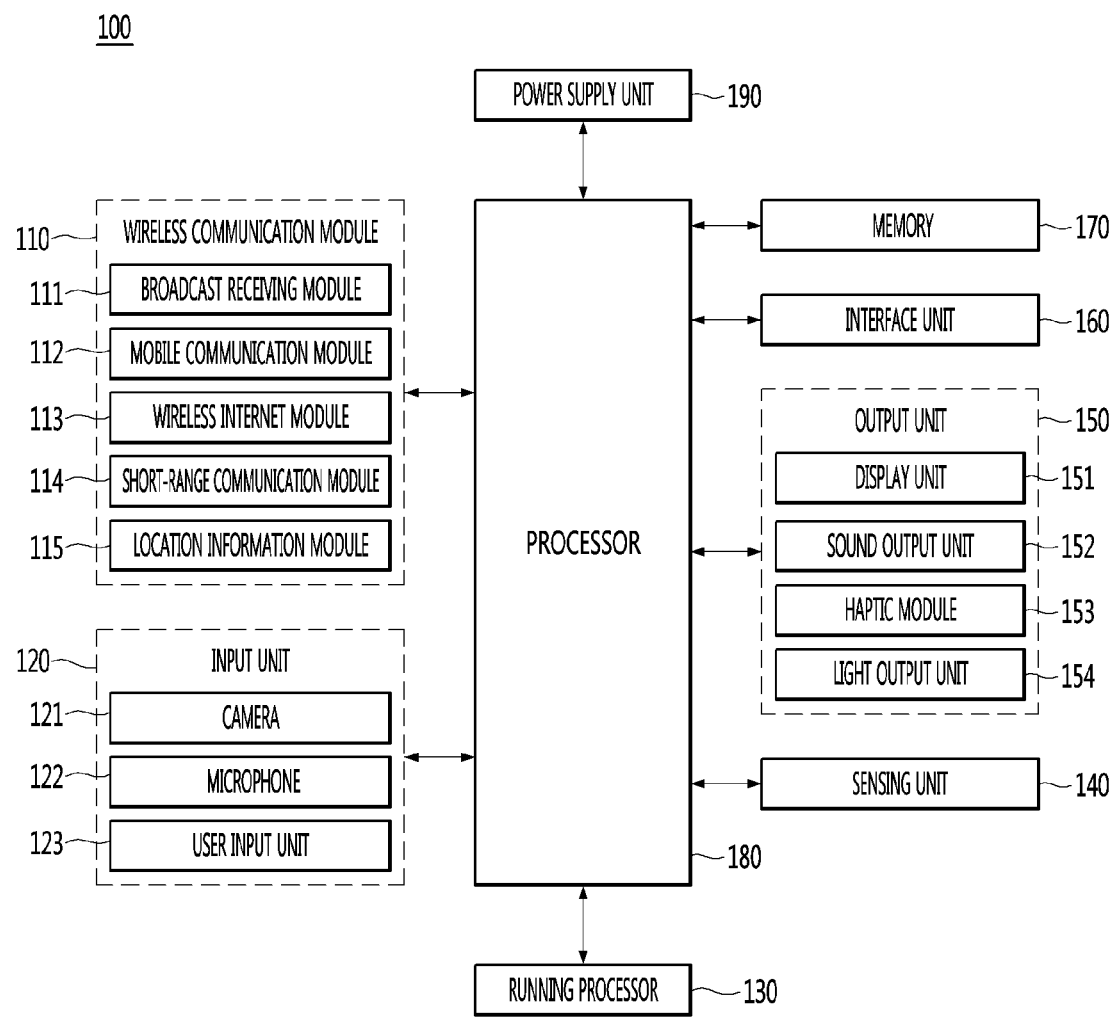
FIG. 1 is a block diagram illustrating a configuration of a terminal 100 according to an embodiment of the present invention.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

Artificial intelligence (AI) is one field of computer engineering and information technology for studying a method of enabling a computer to perform thinking, learning, and self-development that can be performed by human intelligence and may denote that a computer imitates an intelligent action of a human.

Moreover, AI is directly/indirectly associated with the other field of computer engineering without being individually provided. Particularly, at present, in various fields of information technology, an attempt to introduce AI components and use the AI components in solving a problem of a corresponding field is being actively done.

Machine learning is one field of AI and is a research field which enables a computer to perform learning without an explicit program.

In detail, machine learning may be technology which studies and establishes a system for performing learning based on experiential data, performing prediction, and autonomously enhancing performance and algorithms relevant thereto. Algorithms of machine learning may use a method which establishes a specific model for obtaining prediction or decision on the basis of input data, rather than a method of executing program instructions which are strictly predefined.

The term "machine learning" may be referred to as "machine learning".

In machine learning, a number of machine learning algorithms for classifying data have been developed. Decision tree, Bayesian network, support vector machine (SVM), and artificial neural network (ANN) are representative examples of the machine learning algorithms.

The decision tree is an analysis method of performing classification and prediction by schematizing a decision rule into a tree structure.

The Bayesian network is a model where a probabilistic relationship (conditional independence) between a plurality of variables is expressed as a graph structure. The Bayesian network is suitable for data mining based on unsupervised learning.

The SVM is a model of supervised learning for pattern recognition and data analysis and is mainly used for classification and regression.

The ANN is a model which implements the operation principle of biological neuron and a connection relationship between neurons and is an information processing system where a plurality of neurons called nodes or processing elements are connected to one another in the form of a layer structure.

The ANN is a model used for machine learning and is a statistical learning algorithm inspired from a neural network (for example, brains in a central nervous system of animals) of biology in machine learning and cognitive science.

In detail, the ANN may denote all models where an artificial neuron (a node) of a network which is formed through a connection of synapses varies a connection strength of synapses through learning, thereby obtaining an ability to solve problems.

The term "ANN" may be referred to as "neural network".

The ANN may include a plurality of layers, and each of the plurality of layers may include a plurality of neurons. Also, the ANN may include a synapse connecting a neuron to another neuron.

The ANN may be generally defined by the following factors: (1) a connection pattern between neurons of a different layer; (2) a learning process of updating a weight of a connection; and (3) an activation function for generating an output value from a weighted sum of inputs received from a previous layer.

The ANN may include network models such as a deep neural network (DNN), a recurrent neural network (RNN), a bidirectional recurrent deep neural network (BRDNN), a multilayer perceptron (MLP), and a convolutional neural network (CNN), but is not limited thereto.

In this specification, the term "layer" may be referred to as "layer".

The ANN may be categorized into single layer neural networks and multilayer neural networks, based on the number of layers.

General single layer neural networks is configured with an input layer and an output layer.

Moreover, general multilayer neural networks is configured with an input layer, at least one hidden layer, and an output layer.

The input layer is a layer which receives external data, and the number of neurons of the input layer is the same the number of input variables, and the hidden layer is located between the input layer and the output layer and receives a signal from the input layer to extract a characteristic from the received signal and may transfer the extracted characteristic to the output layer. The output layer receives a signal from the hidden layer and outputs an output value based on the received signal. An input signal between neurons may be multiplied by each connection strength (weight), and values obtained through the multiplication may be summated. When the sum is greater than a threshold value of a neuron, the neuron may be activated and may output an output value obtained through an activation function.

The DNN including a plurality of hidden layers between an input layer and an output layer may be a representative ANN which implements deep learning which is a kind of machine learning technology.

The term "deep learning" may be referred to as "deep learning".

The ANN may be trained by using training data. Here, training may denote a process of determining a parameter of the ANN, for achieving purposes such as classifying, regressing, or clustering input data. A representative example of a parameter of the ANN may include a weight assigned to a synapse or a bias applied to a neuron.

An ANN trained based on training data may classify or cluster input data, based on a pattern of the input data.

In this specification, an ANN trained based on training data may be referred to as a trained model.

Next, a learning method of an ANN will be described.

The learning method of the ANN may be largely classified into supervised learning, unsupervised learning, semi-supervised learning, and reinforcement learning.

The supervised learning may be a method of machine learning for analogizing one function from training data.

Moreover, in analogized functions, a function of outputting continual values may be referred to as regression, and a function of predicting and outputting a class of an input vector may be referred to as classification.

In the supervised learning, an ANN may be trained in a state where a label of training data is assigned.

Here, the label may denote a right answer (or a result value) to be inferred by an ANN when training data is input to the ANN.

In this specification, a right answer (or a result value) to be inferred by an ANN when training data is input to the ANN may be referred to as a label or labeling data.

Moreover, in this specification, a process of assigning a label to training data for learning of an ANN may be referred to as a process which labels labeling data to training data.

In this case, training data and a label corresponding to the training data may configure one training set and may be inputted to an ANN in the form of training sets.

Training data may represent a plurality of features, and a label being labeled to training data may denote that the label is assigned to a feature represented by the training data. In this case, the training data may represent a feature of an input object as a vector type.

An ANN may analogize a function corresponding to an association relationship between training data and labeling data by using the training data and the labeling data. Also, a parameter of the ANN may be determined (optimized) through evaluating the analogized function.

The unsupervised learning is a kind of machine learning, and in this case, a label may not be assigned to training data.

In detail, the unsupervised learning may be a learning method of training an ANN so as to detect a pattern from training data itself and classify the training data, rather than to detect an association relationship between the training data and a label corresponding to the training data.

Examples of the unsupervised learning may include clustering and independent component analysis.

In this specification, the term "clustering" may be referred to as "clustering".

Examples of an ANN using the unsupervised learning may include a generative adversarial network (GAN) and an autoencoder (AE).

The GAN is a method of improving performance through competition between two different AIs called a generator and a discriminator.

In this case, the generator is a model for creating new data and generates new data, based on original data.

Moreover, the discriminator is a model for recognizing a pattern of data and determines whether inputted data is original data or fake data generated from the generator.

Moreover, the generator may be trained by receiving and using data which does not deceive the discriminator, and the discriminator may be trained by receiving and using deceived data generated by the generator. Therefore, the generator may evolve so as to deceive the discriminator as much as possible, and the discriminator may evolve so as to distinguish original data from data generated by the generator.

The AE is a neural network for reproducing an input as an output.

The AE may include an input layer, at least one hidden layer, and an output layer.

In this case, the number of node of the hidden layer may be smaller than the number of nodes of the input layer, and thus, a dimension of data may be reduced, whereby compression or encoding may be performed.

Moreover, data outputted from the hidden layer may enter the output layer. In this case, the number of nodes of the output layer may be larger than the number of nodes of the hidden layer, and thus, a dimension of the data may increase, and thus, decompression or decoding may be performed.

The AE may control the connection strength of a neuron through learning, and thus, input data may be expressed as hidden layer data. In the hidden layer, information may be expressed by using a smaller number of neurons than those of the input layer, and input data being reproduced as an output may denote that the hidden layer detects and expresses a hidden pattern from the input data.

The semi-supervised learning is a kind of machine learning and may denote a learning method which uses both training data with a label assigned thereto and training data with no label assigned thereto.

As a type of semi-supervised learning technique, there is a technique which infers a label of training data with no label assigned thereto and performs learning by using the inferred label, and such a technique may be usefully used for a case where the cost expended in labeling is large.

The reinforcement learning may be a theory where, when an environment where an agent is capable of determining an action to take at every moment is provided, the best way is obtained through experience without data.

The reinforcement learning may be performed by a Markov decision process (MDP).

To describe the MDP, firstly an environment where pieces of information needed for taking a next action of an agent may be provided, secondly an action which is to be taken by the agent in the environment may be defined, thirdly a reward provided based on a good action of the agent and a penalty provided based on a poor action of the agent may be defined, and fourthly an optimal policy may be derived through experience which is repeated until a future reward reaches a highest score.

An artificial neural network may be specified in structure by a configuration of a model, an activation function, a loss function, or a cost function, a learning algorithm, an optimization algorithm, and the like. A hyperparameter may be set in advance before the learning, and then, a model parameter may be set through the learning to specify contents thereof.

For example, factors that determine the structure of the artificial neural network may include the number of hidden layers, the number of hidden nodes included in each of the hidden layers, an input feature vector, a target feature vector, and the like.

The hyperparameter includes various parameters that have to be initially set for learning such as an initial value of the model parameter. Also, the model parameter includes several parameters to be determined through the learning.

For example, the hyperparameter may include an initial weight value between the nodes, an initial deflection value between the nodes, a mini-batch size, the number of learning repetition, a learning rate, and the like. Also, the model parameter may include a weight between the nods, a deflection between the nodes, and the like.

The loss function can be used for an index (reference) for determining optimum model parameters in a training process of an artificial neural network. In an artificial neural network, training means a process of adjusting model parameters to reduce the loss function and the object of training can be considered as determining model parameters that minimize the loss function.

The loss function may mainly use a mean squared error (MSE) or a cross entropy error (CEE), but the present invention is not limited thereto.

The CEE may be used when a correct answer label is one-hot encoded. One-hot encoding is an encoding method for setting a correct answer label value to 1 for only neurons corresponding to a correct answer and setting a correct answer label to 0 for neurons corresponding to a wrong answer.

A learning optimization algorithm may be used to minimize a loss function in machine learning or deep learning, as the learning optimization algorithm, there are Gradient Descent (GD), Stochastic Gradient Descent (SGD), Momentum, NAG (Nesterov Accelerate Gradient), Adagrad, AdaDelta, RMSProp, Adam, and Nadam.

The GD is a technique that adjusts model parameters such that a loss function value decreases in consideration of the gradient of a loss function in the current state.

The direction of adjusting model parameters is referred to as a step direction and the size of adjustment is referred to as a step size.

Here, the step size may mean the learning rate.

In the GD, a gradient may be acquired by partially differentiating the loss function into each of the model parameters, and the model parameters may be updated by changing the model parameters by the learning rate in a direction of the acquired gradient.

The SGD is a technique that increases the frequency of gradient descent by dividing training data into mini-batches and performing the GD for each of the mini-batches.

The Adagrad, AdaDelta, and RMSProp in the SGD are techniques that increase optimization accuracy by adjusting the step size. The momentum and the NAG in the SGD are techniques that increase optimization accuracy by adjusting the step direction. The Adam is a technique that increases optimization accuracy by adjusting the step size and the step direction by combining the momentum and the RMSProp. The Nadam is a technique that increases optimization accuracy by adjusting the step size and the step direction by combining the NAG and the RMSProp.

The learning speed and accuracy of an artificial neural network greatly depends on not only the structure of the artificial neural network and the kind of a learning optimization algorithm, but the hyperparameters. Accordingly, in order to acquire a good trained model, it is important not only to determine a suitable structure of an artificial neural network, but also to set suitable hyperparameters.

In general, hyperparameters are experimentally set to various values to train an artificial neural network, and are set to optimum values that provide stable learning speed and accuracy using training results.

FIG. 1 is a block diagram illustrating a configuration of a terminal 100 according to an embodiment of the present invention. The terminal 100 may be implemented for a television (TV), a projector, a mobile phone, a smart phone, a laptop computer, a digital broadcasting terminal, a personal digital assistant (PDA), a portable multimedia player (PMP) a slate PC, a tablet PC, an ultrabook, a wearable device (for example, a smartwatch, a smart glass, a head mounted display (HMD)), a set-top box (STB), a DMB receiver, a radio, a washing machine, a refrigerator, an air conditioner, a desktop computer, fixed equipment such as a digital signage, movable equipment, and the like.

That is, the terminal 100 may be implemented in various household appliances used in the home and may be applied to fixed or movable robots.

The terminal 100 may perform a function of a voice agent. The voice agent may be a program for recognizing a voice of the user and outputting a voice corresponding to the recognized voice of the user.

Referring to FIG. 1, the terminal 100 may include a wireless communication unit 110, an input unit 120, a learning processor 130, a sensing unit 140, an output unit 150, an interface unit 160, a memory 170, a processor 180, and a power supply unit 190.

The trained model may be mounted on the terminal 100.

The trained model may be implemented as hardware, software, or a combination of the hardware and the software. When a portion or the whole of the trained model is implemented as the software, one or more commands constituting the trained model may be stored in the memory 170.

The wireless communication unit 110 may include at least one of a broadcast receiving module 111, a mobile communication module 112, a wireless Internet module 113, a short-range communication module 114, or a location information module 115.

The broadcast receiving module 111 of the wireless communication unit 110 may receive a broadcast signal and/or broadcast related information from an external broadcast management server through a broadcast channel.

The mobile communication module 112 may transmit/receive a wireless signal to/from at least one of a base station, an external terminal, or a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless Internet module 113 refers to a module for wireless internet access and may be built in or external to the mobile terminal 100. The wireless Internet module 113 may be configured to transmit/receive a wireless signal in a communication network according to wireless internet technologies.

The wireless internet technology may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A) and the wireless internet module 113 transmits/receives data according at least one wireless internet technology including internet technology not listed above.

The short-range communication module 114 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, or Wireless Universal Serial Bus (USB) technologies.

The location information module 115 is a module for obtaining the location (or the current location) of a mobile terminal and its representative examples include a global positioning system (GPS) module or a Wi-Fi module. For example, the mobile terminal may obtain its position by using a signal transmitted from a GPS satellite through the GPS module.

The input unit 120 may include a camera 121 for image signal input, a microphone 122 for receiving audio signal input, and a user input part 123 for receiving information from a user.

Voice data or image data collected by the input unit 120 are analyzed and processed as a user's control command.

The input unit 120 may acquire training data for the model learning and input data to be used when an output is acquired using the trained model.

The input unit 120 may acquire input data that is not processed. In this case, the processor 180 or the learning processor 130 may preprocess the acquired data to generate training data that is capable of being inputted into the model learning or preprocessed input data.

Here, the preprocessing for the input data may mean extracting of an input feature from the input data.

Then, the input unit 120 is used for inputting image information (or signal), audio information (or signal), data, or information inputted from a user and the mobile terminal 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the mobile terminal 100. Moreover, various noise canceling algorithms for removing noise occurring during the reception of external sound signals may be implemented in the microphone 122.

The user input part 123 is to receive information from a user and when information is inputted through the user input part 123, the processor 180 may control an operation of the mobile terminal 100 to correspond to the inputted information.

The user input part 123 may include a mechanical input means (or a mechanical key, for example, a button, a dome switch, a jog wheel, and a jog switch at the front, back or side of the mobile terminal 100) and a touch type input means. As one example, a touch type input means may include a virtual key, a soft key, or a visual key, which is displayed on a touch screen through software processing or may include a touch key disposed at a portion other than the touch screen.

The learning processor 130 learns a model composed of the artificial neural network by using the training data.

Particularly, the learning processor 130 may determine optimized model parameters of the artificial neural network by repeatedly learning the artificial neural network by using the above-described various learning techniques.

In this specification, since the artificial neural network is learned by using the training data, the artificial neural network of which the parameters are determined may be called a learned model or a trained model.

Here, the trained model may be used to infer results for new input data rather than training data.

The learning processor 130 may be configured to receive, classify, store, and output information which is to be used for data mining, data analysis, intelligent decision, and machine learning algorithms.

The learning processor 130 may include one or more memory units which are configured to store data received, detected, sensed, generated, pre-defined, or outputted by another component, another device, another terminal, or an apparatus communicating with the terminal.

The learning processor 130 may include a memory which is integrated into or implemented in a terminal. In some embodiments, the learning processor 130 may be implemented with the memory 170.

Optionally or additionally, the learning processor 130 may be implemented with a memory associated with a terminal like an external memory directly coupled to the terminal or a memory which is maintained in a server communicating with the terminal.

In another embodiment, the learning processor 130 may be implemented with a memory maintained in a cloud computing environment or another remote memory position accessible by a terminal through a communication manner such as a network.

The learning processor 130 generally stores data in one or more databases to identify, index, categorize, manipulate, store, retrieve, and output data for use in supervised or unsupervised learning, data mining, predictive analytics, or other machines. Here, the database may be implemented using a memory 170, a memory 230 of the learning device 200, a memory maintained under cloud computing environments, or other remote memory locations that are accessible by the terminal through a communication scheme such as a network.

Information stored in the learning processor 130 may be used by the processor 180 or one or more other controllers of a terminal by using at least one of various different types of data analysis algorithm or machine learning algorithm.

Examples of such algorithms may include a k-nearest neighbor system, a purge logic (for example, possibility theory), a neural network, Boltzmann machine, vector quantization, a pulse neural network, a support vector machine, a maximum margin classifier, hill climbing, an induction logic system Bayesian network, perrytnet (for example, a finite state machine, a milli machine, and a moor finite state machine), a classifier tree (for example, a perceptron tree, a support vector tree, a Markov tree, a decision tree forest, and an arbitrary forest), a reading model and system, artificial mergence, sensor mergence, image mergence, reinforcement mergence, augment reality, pattern recognition, and automated plan.

The processor 180 may determine or predict at least one executable operation of a terminal, based on information determined or generated by using a data analysis algorithm and a machine learning algorithm. To this end, the processor 180 may request, search for, receive, or use data of the learning processor 130 and may control the terminal to execute a predicted operation or a preferably determined operation of the at least one executable operation.

The processor 180 may perform various functions of implementing an intelligent emulation (i.e., a knowledge-based system, an inference system, and a knowledge acquisition system). The processor 180 may be applied to various types of systems (for example, a purge logic system) including an adaptive system, a machine learning system, and an ANN.

The processor 180 may include a sub-module enabling an arithmetic operation of processing a voice and a natural language voice, like an input/output (I/O) processing module, an environment condition processing module, a speech-to-text (STT) processing module, a natural language processing module, a work flow processing module, and a service processing module.

Each of such sub-modules may access one or more systems or data and models or a subset or superset thereof in a terminal. Also, each of the sub-modules may provide various functions in addition to vocabulary index, user data, a work flow model, a service model, and an automatic speech recognition (ASR) system.

In another embodiment, another aspect of the processor 180 or a terminal may be implemented with the sub-module, system, or data and model.

In some embodiments, based on data of the learning processor 130, the processor 180 may be configured to detect and sense a requirement on the basis of an intention of a user or a context condition expressed as a user input or a natural language input.

The processor 180 may actively derive and obtain information which is needed in completely determining the requirement on the basis of the intention of the user or the context condition. For example, the processor 180 may analyze past data including an input log, an output log, pattern matching, unambiguous words, and an input intention, thereby actively deriving needed for determining the requirement.

The processor 180 may determine task flow for executing a function of responding to the requirement, based on the intention of the user or the context condition.

The processor 180 may be configured to collect, sense, extract, detect, and/or receive a signal or data used for data analysis and a machine learning operation through one or more sensing components in a terminal, for collecting information which is to be processed and stored in the learning processor 130.

Collecting of information may include an operation of sensing information through a sensor, an operation of extracting information stored in the memory 170, or an operation of receiving information through a communication means from another terminal, an entity, or an external storage device.

The processor 180 may collect usage history information from the terminal and may store the collected usage history information in the memory 170.

The processor 180 may determine an optimal match for executing a specific function by using the stored usage history information and prediction modeling.

The processor 180 may receive or sense ambient environmental information or other information through the sensing unit 140.

The processor 180 may receive a broadcast signal and/or broadcast-related information, a wireless signal, and wireless data through the wireless communication unit 110.

The processor 180 may receive image information (or a corresponding signal), audio information (or a corresponding signal), data, or user input information through the input unit 120.

The processor 180 may collect information in real time and may process or classify the collected information (for example, a knowledge graph, an instruction policy, an individualization database, a dialogue engine, etc.) and may store the processed information in the memory 170 or the learning processor 130.

When an operation of the terminal is determined based on the data analysis algorithm, the machine learning algorithm, and technique, the processor 180 may control elements of the terminal for executing the determined operation. Also, the processor 180 may control the terminal according to a control instruction to perform the determined operation.

When a specific operation is performed, the processor 180 may analyze history information representing execution of the specific operation through the data analysis algorithm, the machine learning algorithm, and technique and may update previously learned information, based on the analyzed information.

Therefore, the processor 180 may enhance an accuracy of a future performance of each of the data analysis algorithm, the machine learning algorithm, and the technique along with the learning processor 130, based on the updated information.

The sensing unit 140 may include at least one sensor for sensing at least one of information in a mobile terminal, environmental information around a mobile terminal, or user information.

For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, the camera 121), a microphone (for example, the microphone 122), a battery gauge, an environmental sensor (for example, a barometer, a hygrometer, a thermometer, a radiation sensor, a thermal sensor, and a gas sensor), or a chemical sensor (for example, an electronic nose, a healthcare sensor, and a biometric sensor). Moreover, a mobile terminal disclosed in this specification may combines information sensed by at least two or more sensors among such sensors and may then utilize it.

The output unit 150 is used to generate a visual, auditory, or haptic output and may include at least one of a display unit 151, a sound output module 152, a haptic module 153, or an optical output module 154.

The display unit 151 may display (output) information processed in the mobile terminal 100. For example, the display unit 151 may display execution screen information of an application program running on the mobile terminal 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input part 123 providing an input interface between the mobile terminal 100 and a user, and an output interface between the mobile terminal 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the mobile terminal 100. An example of an event occurring in the mobile terminal 100 includes message reception, call signal reception, missed calls, alarm, schedule notification, e-mail reception, and information reception through an application.

The interface unit 160 may serve as a path to various kinds of external devices connected to the mobile terminal 100. The interface unit 160 may include at least one of a wired/wireless headset port, an external charger port, a wired/wireless data port, a memory card port, a port connecting a device equipped with an identification module, an audio Input/Output (I/O) port, an image I/O port, and or an earphone port. In correspondence to that an external device is connected to the interface unit 160, the mobile terminal 100 may perform an appropriate control relating to the connected external device.

Moreover, the identification module, as a chip storing various information for authenticating usage authority of the mobile terminal 100, may include a user identity module (UIM), a subscriber identity module (SIM), and a universal subscriber identity module (USIM). A device equipped with an identification module (hereinafter referred to as an identification device) may be manufactured in a smart card form. Accordingly, the identification device may be connected to the terminal 100 through the interface unit 160.

The memory 170 may store data for supporting various functions of the terminal 100.

The memory 170 may store a plurality of application programs or applications executed in the terminal 100, pieces of data and instructions for an operation of the terminal 100, and pieces of data (for example, at least one piece of algorithm information for machine learning) for an operation of the learning processor 130.

The memory 170 may store a model that is learned in the learning processor 130 or the learning device 200.

Here, the memory 170 may store the learned model into a plurality of versions according to a learning time point, a learning progress, and the like.

Here, the memory 170 may store the input data acquired by the input unit 120, the learning data (or the training data) used for the model learning, a learning history of the model, and the like.

Here, the input data stored in the memory 170 may be input data itself, which is not processed, as well as data that is processed adequate for the model learning.

The processor 180 may control overall operations of the mobile terminal 100 generally besides an operation relating to the application program. The processor 180 may provide appropriate information or functions to a user or process them by processing signals, data, and information inputted/outputted through the above components or executing application programs stored in the memory 170.

Additionally, in order to execute an application program stored in the memory 170, the processor 180 may control at least part of the components shown in FIG. 1. Furthermore, in order to execute the application program, the processor 180 may combine at least two of the components in the mobile terminal 100 and may then operate it.

As described above, the processor 180 may control an operation associated with an application program and an overall operation of the terminal 100. For example, when a state of the terminal 100 satisfies a predetermined condition, the processor 180 may execute or release a lock state which limits an input of a control command of a user for applications.

The power supply unit 190 may receive external power or internal power under a control of the processor 180 and may then supply power to each component in the mobile terminal 100. The power supply unit 190 includes a battery and the battery may be a built-in battery or a replaceable battery.

Figure 2:
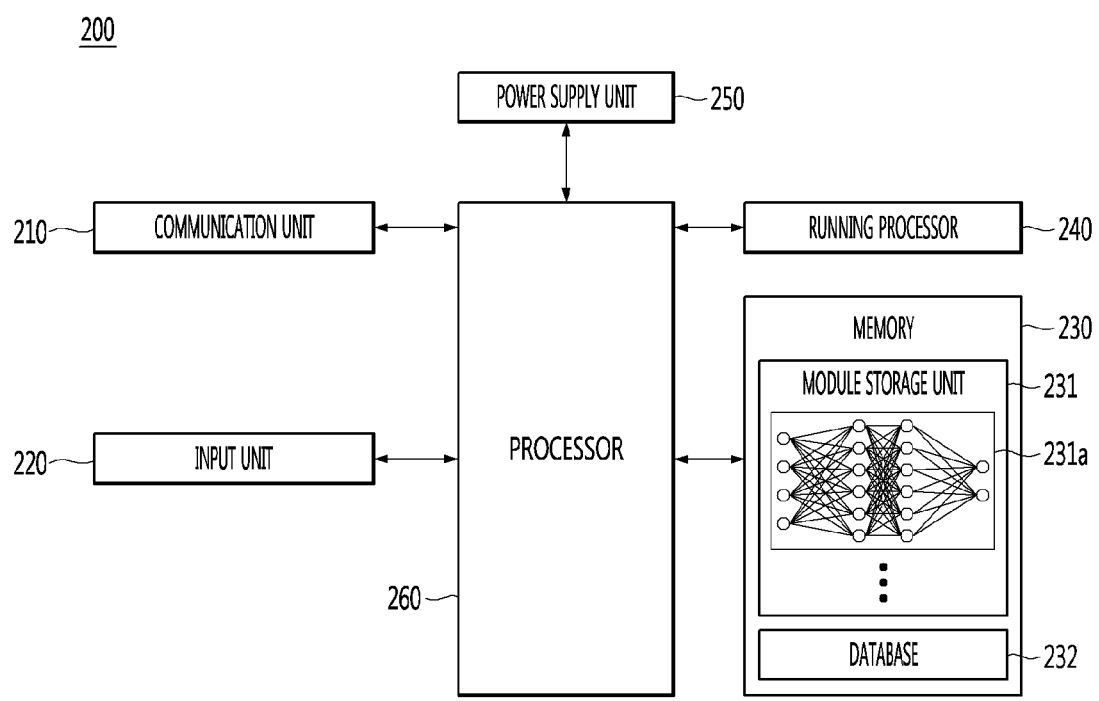
FIG. 2 is a block diagram illustrating a configuration of a learning device 200 of an artificial neural network according to an embodiment of the present invention.

FIG. 2 is a block diagram illustrating a configuration of the learning device 200 of the artificial neural network according to an embodiment of the present invention.

The learning device 200 may be a device or server that is separately provided outside the terminal 100 and perform the same function as the learning processor 130 of the terminal 100.

That is, the learning device 200 may be configured to receive, classify, store, and output information to be used for data mining, data analysis, intelligent decision making, and machine learning algorithm. Here, the machine learning algorithm may include a deep learning algorithm.

The learning device 200 may communicate with at least one terminal 100 and analyze or train the data instead of the terminal 100 or by assisting the terminal 100 to derive results. Here, the assisting for the other devices may mean distribution of computing power through distribution processing.

The learning device 200 for the artificial neural network may be a variety of apparatuses for learning an artificial neural network and may be generally called a server or called a learning device or a learning server.

Particularly, the learning device 200 may be implemented not only as a single server but also as a plurality of server sets, a cloud server, or a combination thereof.

That is, the learning device 200 may be provided in a plurality to constitute the learning device set (or the cloud server). At least one or more learning device 200 included in the learning device set may analyze or train data through the distribution processing to derive the result.

The learning device 200 may transmit the model that is learned by the machine learning or the deep learning to the terminal periodically or by demands.

Referring to FIG. 2, the learning device 200 may include a communication unit 210, an input unit 220, a memory 230, a learning processor 240, a power supply unit 250, a processor, 260, and the like.

The communication unit 210 may correspond to a constituent including the wireless communication unit 110 and the interface unit 160 of FIG. 1. That is, the communication unit 210 may transmit and receive data to/from other devices through wired/wireless communication or an interface.

The input unit 220 may be a constituent corresponding to the input unit 120 of FIG. 1 and may acquire data by receiving the data through the communication unit 210.

The input unit 220 may acquire training data for the model learning and input data for acquiring an output by using the trained model.

The input unit 220 may acquire input data that is not processed. In this case, the processor 130 may preprocess the acquired data to generate training data that is capable of being inputted into the model learning or preprocessed input data.

Here, the preprocessing for the input data, which is performed in the input unit 220, may mean extracting of an input feature from the input data.

The memory 230 is a constituent corresponding to the memory 170 of FIG. 1.

The memory 230 may include a model storage part 231 and a database 232.

The model storage part 231 may store a model being learned or a learned model (or an artificial neural network 231*a*) through the learning processor 240 to store the updated model when the model is updated through the learning.

Here, the model storage part 231 may store the trained model into a plurality of versions according to a learning time point, a learning progress, and the like.

The artificial neural network 231*a* illustrated in FIG. 2 may be merely an example of the artificial neural network including a plurality of hidden layers, and the artificial neural network of the present invention is not limited thereto.

The artificial neural network 231*a* may be implemented as hardware, software, or a combination of the hardware and the software. When a portion or the whole of the artificial neural network 231*a* is implemented as the software, one or more commands constituting the artificial neural network 231*a* may be stored in the memory 230.

The database 232 may store the input data acquired by the input unit 220, the learning data (or the training data) used for the model learning, a learning history of the model, and the like.

The database 232 stored in the memory 232 may be input data itself, which is not processed, as well as data that is processed adequate for the model learning.

The learning processor 240 is a constituent corresponding to the learning processor 130 of FIG. 1.

The learning processor 240 may train (or learn) the artificial neural network 231a by using the training data or the training set.

The learning processor 240 may directly acquire the processed data of the input data acquired through the input unit 220 to train the artificial neural network 231a or acquire the processed input data stored in the database 232 to train the artificial neural network 231a.

Particularly, the learning processor 240 may determine optimized model parameters of the artificial neural network 231a by repeatedly learning the artificial neural network 231a by using the above-described various learning techniques.

In this specification, since the artificial neural network is learned by using the training data, the artificial neural network of which the parameters are determined may be called a learned model or a trained model.

Here, the trained model may infer a result value in a state in which the trained model is installed on the learning device 200 or may be transmitted to the other device such as the terminal 100 through the communication unit 210 so as to be mounted.

Also, when the trained model is updated, the updated trained model may be transmitted to the other device such as the terminal 100 through the communication unit 210 so as to be mounted.

The power supply unit 250 is a constituent corresponding to the power supply unit 190 of FIG. 1.

Duplicated description with respect to the constituents corresponding to each other will be omitted.

The term "terminal 100" described with reference to FIG. 1 may be used interchangeable with the term "vehicle control apparatus 100".

The vehicle control apparatus 100 is mounted in the vehicle.

Figure 3:
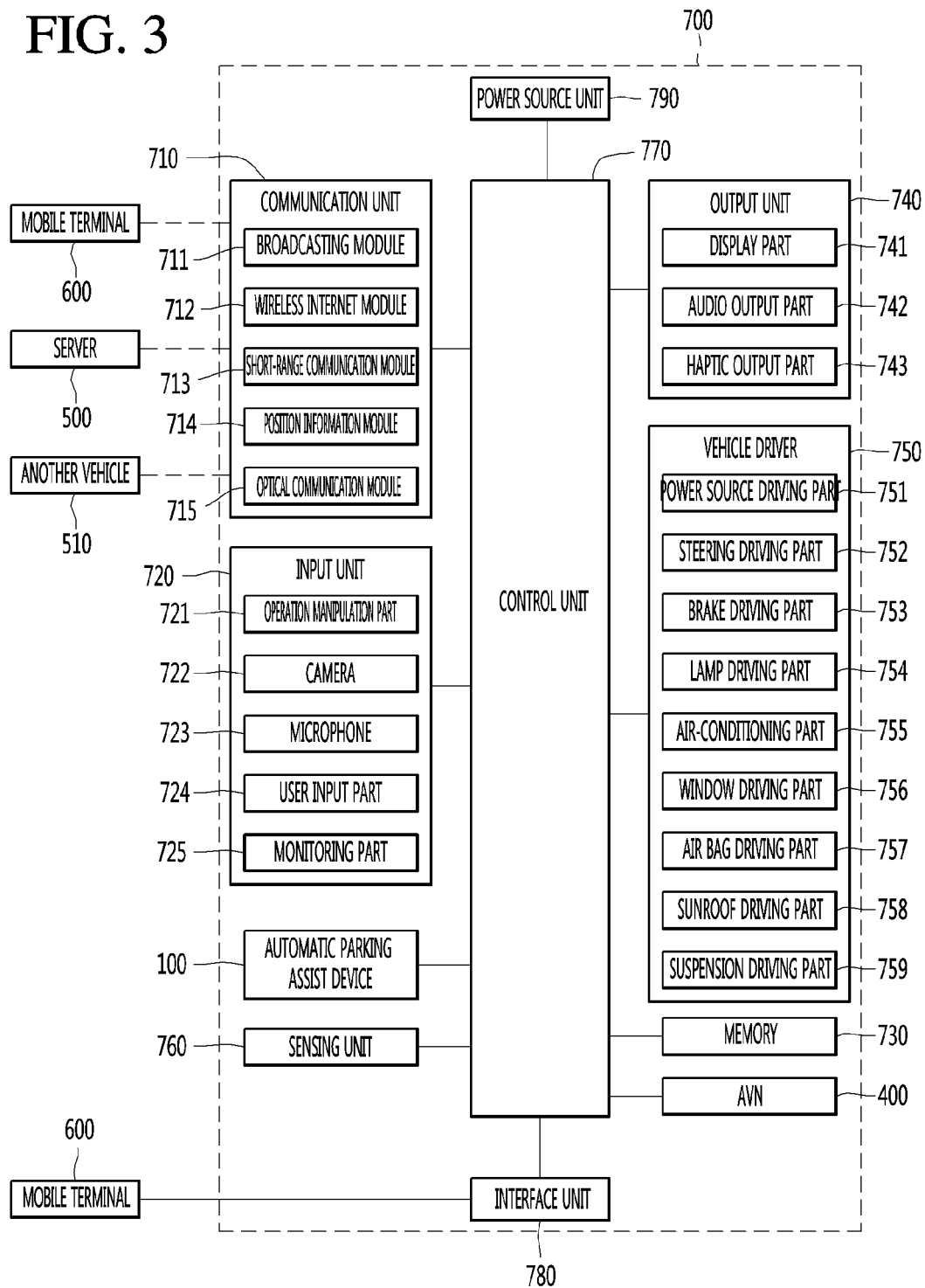
FIG. 3 is a block diagram for explaining a configuration of a vehicle.

FIG. 3 is a block diagram for explaining a configuration of the vehicle.

Referring to FIG. 3, the vehicle may include a communication unit 710, an input unit 720, a sensing unit 760, an output unit 740, a vehicle driver 750, a memory 730, an interface unit 780, a control unit 770, and a power source unit 790, an automatic parking assist device, and an AVN device 400. Here, units provided in the automatic parking assist device and units having the same name among the units may be included in the vehicle.

The communication unit 710 may include one or more modules that facilitate wireless communication between the vehicle 1000 and the mobile terminal 600 and between the vehicle 500 and the server 510 or between the vehicle and other vehicles 510. Also, the communication unit 710 may include one or more modules connecting the vehicle to one or more networks.

The communication unit 710 may include a broadcast receiving module 711, a wireless Internet module 712, a short-range communication module 713, a location information module 714, and an optical communication module 715.

The broadcast receiving module 711 receives a broadcast signal or broadcast-related information from an external broadcast management server through a broadcast channel. Here, the broadcast includes radio broadcast or TV broadcast.

The wireless Internet module 712 may be a module for wireless Internet access. The wireless Internet module 303 may be embedded in the vehicle 1000 or installed in an external device. The wireless Internet module 712 may transmit and receiver a wireless signal in a communications network based on wireless Internet technologies.

For example, examples of the wireless Internet technologies may include wireless LAN (WLAN), wireless fidelity (Wi-Fi), Wi-Fi direct, digital living network alliance (DLNA), wireless broadband (WiBro), worldwide interoperability for microwave access (WiMAX), high speed downlink packet access (HSDPA), high speed uplink packet access (HSUPA), long term evolution (LTE), long term evolution-advanced (LTE-A), and the like. The wireless Internet module 712 may transmit and receive data according to at least one of the foregoing wireless Internet technologies and other Internet technologies as well. For example, the wireless Internet module 712 may wirelessly exchange data with the external server 500. The wireless Internet module 712 may receive weather information, traffic condition information of a road (e.g., transport protocol expert group (TPEG) information) from the external server 500.

The short range communication module 713 may be configured to facilitate short-range communication. The short range communication module 305 may support short range communication by using at least one of Bluetooth (Bluetooth™), radio frequency Identification (RFID), infrared data association (IrDA), ultra-wideband (UWB), ZigBee, near field communication (NFC), wireless-fidelity (Wi-Fi), Wi-Fi direct, wireless universal serial bus (Wireless USB), and the like.

The short range communication module 713 may form wireless area networks to perform short range communication between the vehicle and at least one external device. For example, the short range communication module 713 may wirelessly exchange data with the mobile terminal 600. The short range communication module 713 may receive weather information, traffic condition information of a road (e.g., transport protocol expert group (TPEG) information) from the mobile terminal 600. For example, when the user rides in the vehicle, the mobile terminal 600 and the vehicle of the user may be executed automatically or executed by user's application to perform fairing therebetween.

The position information module 714 may be a module for acquiring a position of the vehicle. There is a global positioning system (GPS) as a representative example of the position information module 307. For example, when the vehicle utilizes the GPS module, a position of the vehicle may be acquired by using a signal transmitted from a GPS satellite.

The optical communication module 715 may include a light emitting part and a light receiving part.

The light receiving part may convert a light signal into an electrical signal to receive information. The light receiving part may include a photo diode (PD) for receiving light. The photo diode may convert light into an electrical signal. For example, the light receiving part may receive information of a front vehicle through light emitted from a light source provided in the front vehicle.

The light emitting part may include at least one light emitting element for converting an electrical signal into a light signal. Here, a light emitting diode (LED) may be provided as the light emitting element. The light emitting part may convert an electrical signal into a light signal to emit the converted light signal to the outside. For example, the light emitting part may emit the light signal to the outside through flickering of the light emitting element corresponding to a predetermined frequency. According to an embodiment, the light emitting part may include a plurality of light emitting element arrays. According to an embodiment, the light emitting part may be integrated with a lamp provided in the vehicle. For example, the light emitting part may be at least one of a headlamp, a taillight, a stop lamp, a turn signal, and a sidelight. For example, the optical communication module 715 may exchange data with another vehicle 510 through optical communication.

The input unit 720 may include a driving manipulation part 721, a camera 195, a microphone 723, and a user input part 724.

The driving manipulation part 721 receives a user input for driving the vehicle. (Hereinafter, see FIG. 4) The driving manipulation part 721 may include a steering input part 721A, a shift input part 721D, an acceleration input part 721C, and a brake input part 721B.

The steering input part 721A receives a vehicle traveling input from the user. The steering input part 721A is preferably formed in the form of a wheel to enable a steering input by rotation. According to an embodiment, the steering input part 721A may be formed as a touch screen, a touch pad, or a button.

The shift input part 721D receives inputs of parking (P), forward (D), neutral (N), and reverse (R) of the vehicle from the user. The shift input part 721D is preferably formed in the form of a lever. The shift input part 721D may be formed as a touch screen, a touch pad, or a button.

The acceleration input part 721C receives an input for accelerating the vehicle from the user. The brake input part 721B receives an input for deceleration of the vehicle from the user. The acceleration input part 721C and the brake input part 721B are preferably formed in the form of a pedal. The acceleration input part 721C or the brake input part 721B may be formed as a touch screen, a touch pad, or a button.

The camera 722 may include an image sensor and an image processing module. The camera 722 may process a still image or a moving image that is obtained by an image sensor (e.g., a CMOS or CCD). The image processing module may process the still image or the moving image that is acquired through the image sensor to extract necessary information and then transmit the extracted information to the control unit 770. The vehicle may include a camera 722 for capturing a vehicle front image or a vehicle surrounding image and a monitoring part 725 for capturing an interior image of the vehicle.

The monitoring part 725 may acquire an image of the occupant. The monitoring part 725 may acquire an image for biometrics of the occupant.

In FIG. 27, although the monitoring part 725 and the camera 722 are included in the input unit 720, the camera 722 may be described as a configuration included in the automatic parking assist device as described above.

The microphone 723 may process an external sound signal into electrical data. The processed data may be variously utilized according to functions that are being performed in the vehicle. The microphone 723 may convert a user's voice command into electrical data. The converted electrical data may be transmitted to the control unit 770.

According to an embodiment, the camera 722 or the microphone 723 may be a component provided in the sensing unit 760, but may not be a component provided in the input unit 720.

The user input part 724 is configured to receive information from the user. When information is inputted through the input part 724, the control unit 770 may control an operation of the vehicle to correspond to the inputted information. The user input part 724 may include a touch type input part or a mechanical input part. According to an embodiment, the user input part 724 may be disposed on one area of a stirring wheel. In this case, the driver may manipulate the user input part 724 by using a finger thereof in a state in which the driver holds the stirring wheel.

The sensing unit 760 senses a signal related to traveling of the vehicle. For this, the sensing unit 760 may include a crash sensor, a wheel sensor, a speed sensor, a tilt sensor, a weight sensor, a heading sensor, a yaw sensor, a gyro sensor, a position module, a vehicle forward movement/backward movement sensor, a battery sensor, a fuel sensor, a tire sensor, a steering sensor by rotation of a handle, an in-vehicle temperature sensor, an in-vehicle humidity sensor, an ultrasonic sensor, a radar, a lidar, and the like.

Thus, the sensing unit 760 may acquire sensing signals with respect to vehicle crush information, vehicle direction information, vehicle position information (GPS information), vehicle angle information, vehicle speed information, vertical acceleration information, vehicle tilt information, vehicle forward movement/backward movement information, battery information, fuel information, tire information, vehicle lamp information, in-vehicle temperature information, in-vehicle humidity information, a steering wheel rotation angle, and the like.

The sensing unit 760 may further include an acceleration pedal sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The sensing unit 760 may include a biometric information detection part. The biometric information detection part detects and acquires biometric information of a passenger. The biometric information may include fingerprint information, iris-scan information, retina-scan information, hand geo-metry information, facial recognition information, and voice recognition information. The biometric information sensing part may include a sensor for sensing the biometric information of the passenger. Each of the monitoring part 725 and the microphone 723 may operate as a sensor. The biometric information sensing part may acquire the hand geo-metry information and the facial recognition information through the monitoring part 725.

The output unit 740 may be configured to output information processed in the control unit 770 and include a display part 741, an acoustic output part 742, and a haptic output part 743.

The display part 741 may display information processed in the control unit 770. For example, the display part 741 may display vehicle-related information. Here, the vehicle-related information may include vehicle control information for direct control of the vehicle or vehicle driving assistance information for driving guidance to the vehicle driver. Also, the vehicle-related information may include vehicle condition information for informing conditions of the present vehicle or vehicle driving information related to the driving of the vehicle.

The display part 741 may include at least one of a liquid crystal display (LCD), a thin film transistor-liquid crystal display (TFT LCD), an organic light-emitting diode (OLED), a flexible display, a 3D display, and an E-ink display.

The display part 741 may form a layered structure together with a touch sensor or be integrated with the touch sensor to realize a touch screen. The touch screen may serve as a user input part 724 that provides an input interface between the vehicle and the user and also provide an output interface between the vehicle and the user. In this case, the display part 741 may include the touch sensor for sensing touch on the display part 741 to receive a control command in a touch manner. Thus, when the touch is performed on the display part 741, the touch sensor may sense the touch, and the control unit 770 may generate a control command corresponding to the touch according to the touch on the display part 601. Contents inputted by the touch manner may include characters or figures or menu items that are capable of being indicated or designated in various modes.

The display part 741 may include a cluster to allow the driver to confirm the vehicle condition information or the vehicle driving information just when the driver drives the vehicle. The cluster may be disposed on a dashboard. In this case, the driver may confirm information displayed on the cluster in a state in which the driver maintains his sight to the front side.

According to an embodiment, the display part 741 may be realized by using a head up display (HUD). When the display part 741 is realized by using the HUD, information may be outputted through the transparent display provided on the windshield. Alternatively, the display part 741 may output information through an image that is projected on the windshield by providing a projection module.

The acoustic output part 742 may convert an electrical signal transmitted from the control unit 770 into an audio signal and then output the converted audio signal. For this, the acoustic output part 742 may include a speaker. The acoustic output 742 may output a sound corresponding an operation of the user input part 724.

The haptic output part 743 generates a tactile output. For example, the haptic output part 743 may operate to oscillate a steering wheel, a safety belt, and a sheet, thereby allowing the user to recognize the output.

The vehicle driver 750 may control operations of various units of the vehicle. The vehicle driver 750 may include a power source driving part 751, a steering driving part 752, a brake driving part 753, a lamp driving part 754, an air-conditioner driving part 755, a window driving part 756, an airbag driving part 757, a sunroof driving part 758, and a suspension driving part 759.

The power source driving part 751 may perform an electronic control with respect to a power source within the vehicle.

For example, when a fossil fuel-based engine (not shown) is provided as a power source, the power source driving part 751 may perform electronic control of the engine. Thus, output torque of the engine may be controlled. When the power source driving part 751 is an engine, a speed of the vehicle may be limited by limiting the engine output torque under the control of the control unit 770.

For another example, when the electric motor (not shown) is a power source, the power source driving part 751 may control the motor. Thus, the rotational speed, torque and the like of the motor may be controlled.

The term "power source driving part 751" may be used interchangeably with the term "accelerator", and the accelerator may be controlled by the control unit 770 or the processor 180 to perform acceleration.

The steering driving part 752 may perform an electronic control with respect to a steering apparatus within the vehicle. Thus, the heading direction of the vehicle may be changed.

The brake driving part 753 may perform an electronic control with respect to a brake apparatus (not shown) within the vehicle. For example, the brake driving part 705 may control an operation of the brake disposed on the wheel to reduce a speed of the vehicle. For another example, the brake driving part 705 may differently control operations of the brakes respectively disposed on left and right wheels to adjust the heading direction of the vehicle to a left or right direction.

The term "brake driving part 753" may be used interchangeably with the term "brake", and the brake may be controlled by the control unit 770 or the processor 180 to perform acceleration.

The lamp driving part 754 may control an turn on/turn off of a lamp disposed on each of the inside and outside of the vehicle. Also, the lamp driving part 707 may control light intensity and direction of the lamp. For example, the lamp driving part 707 may perform a control of each of a turn signal lamp and a brake lamp.

The air-conditioner driving part 755 may perform an electronic control with respect to an air conditioner (not shown) within the vehicle. For example, if an inner temperature of the vehicle is high, the air conditioner may operate to control supply of cool air into the vehicle.

The window driving part 756 may perform an electronic control with respect to a window apparatus within the vehicle. For example, the window driving part 711 may control an opening or closing of each of left and right windows disposed on side surfaces of the vehicle 1000.

The airbag driving part 757 may perform an electronic control with respect to an airbag apparatus within the vehicle. For example, the airbag driving part 713 may control so that an airbag is inflated in emergency.

The sunroof driving part 758 may perform an electronic control with respect to a sunroof apparatus (not shown) within the vehicle. For example, the sunroof driving part 715 may control an opening or closing of a sunroof.

The suspension driving part 759 may perform an electronic control with respect to a suspension apparatus (not shown) within the vehicle. For example, when a curved road exists, the suspension driving part 715 controls the suspension apparatus reduce vibration of the vehicle.

The memory 730 is electrically connected to the control unit 770. The memory 770 may store basic data for the unit, control data for controlling the operation of the unit, and input/output data. The memory 790 may be various storage devices such as a ROM, a RAM, an EPROM, a flash drive, a hard drive, and the like, in hardware. The memory 730 may store various data for an overall operation of the vehicle such as program for processing or controlling the control unit 770.

The interface unit 780 may serve as a passage for various kinds of external devices connected to the vehicle. For example, the interface unit 780 may include a port that is connectable to the mobile terminal 600 and be connected to the mobile terminal 600 through the port. In this case, the interface unit 780 may exchange data with the mobile terminal 600.

The interface unit 780 may serve as a passage for supplying electric energy to the mobile terminal 600 connected thereto. When the mobile terminal 600 is electrically connected to the interface unit 780, the interface unit 780 provides the electric energy supplied from the power source unit 790 to the mobile terminal 600 under the control of the control unit 770.

The control unit 770 may control an overall operation of each of the units within the vehicle. The control unit 770 may be called an electronic control unit (ECU).

The control unit 770 may execute a function corresponding to the transmitted signal according to execution signal transmission of the automatic parking assist device.

The control unit 770 may be embodied by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performing other functions.

The control unit 770 may delegate the role of the processor 170 described above. That is, the processor 170 of the automatic parking assist device may be directly set in the control unit 770 of the vehicle. It may be understood that the automatic parking assist device refers to a combination of some components of the vehicle.

Alternatively, the control unit 770 may control the components to transmit the information requested by the processor 170.

The power source unit 790 may supply power required for operating each of components under the control of the control unit 770. Particularly, the power supply unit 770 may receive power from a battery (not shown) provided in the vehicle 1000.

The AVN device 400 may exchange data with the control unit 770. The control unit 770 may receive navigation information from the AVN device 400 or a separate navigation device (not shown). Here, the navigation information may include set destination information, route information according to the destination, map information or vehicle location information related to driving of the vehicle.

The vehicle control apparatus 100 may be mounted on the vehicle to communicate with the components of the vehicle described with reference to FIG. 3. The processor of the vehicle control apparatus 100 may directly control the components of the vehicle described with reference to FIG. 3 or indirectly control the components of the vehicle by transmitting a command to the control unit 770 of the vehicle.

The sensing unit 140 of the vehicle control apparatus 100 described with reference to FIG. 1 may include a distance sensor.

Here, the distance sensor may detect a position of an object located near the vehicle.

The distance sensor may accurately detect a position of the object in the vehicle, a direction from which the object is spaced apart, a separation distance, or a moving direction of the object. The distance sensor may continuously measure the position with the detected object so that the change in the positional relationship with the present vehicle is accurately detected.

The distance sensor may detect an object located in at least one of front, rear, left, or right sides of the vehicle. For this, the distance sensor may be arranged at various positions of the vehicle.

The distance sensor may include one or more of various distance measuring sensors such as a lidar sensor, a laser sensor, an ultrasonic waves sensor, and a stereo camera.

For example, the distance sensor may be the laser sensor and use a time-of-flight (TOF) or/and phase-shift method according to a laser signal modulation method to accurately measure the positional relationship between the vehicle and the object.

Also, the distance sensor may include a camera.

Also, the information about the object may be obtained by analyzing the image captured by the camera by the processor 180.

The processor 180 may capture the front, side, rear, and the like of the vehicle with a camera, and the processor 180 may analyze the obtained vehicle surrounding image to detect an object around the vehicle and determine the property of the object to generate sensor information.

Here, the sensor information may be at least one of a kind of the object, traffic signal information displayed by the object, a distance between the object and the vehicle, or a position of the object.

In detail, the processor 180 may generate image information by detecting the object in the image captured through image processing, tracking the object, measuring a distance to the object, and confirming the object to perform object analysis.

The camera may be provided at various positions.

In detail, the camera may include an inner camera that captures the front of the vehicle to acquire a front image inside the vehicle.

The plurality of cameras may be respectively disposed at at least one or more positions of the left side, the rear side, the right side, the front side, and the ceiling of the vehicle.

The sensor information obtained by the sensing unit 140 may include at least one or more of direction information, position information, vehicle speed information, acceleration information, tilt information, forward/reverse information, fuel information, distance information between the front and rear vehicles, distance between the vehicle and the lane, or turn signal information.

Also, the sensor information may be obtained from a heading sensor, a yaw sensor, a gyro sensor, a position module, a vehicle forward/reverse sensor, a wheel sensor, a vehicle speed sensor, a body tilt detection sensor, a battery sensor, a fuel sensor, a tire sensor, a steering sensor by rotation of a steering wheel, a vehicle interior temperature sensor, a vehicle interior humidity sensor, a door sensor, and the like. The position module may include a GPS module for receiving GPS information.

The configurations of the vehicle described with reference to FIG. 3 may be configurations of the vehicle control apparatus.

The sensing unit 760 may be included in the vehicle control apparatus.

Figure 4:
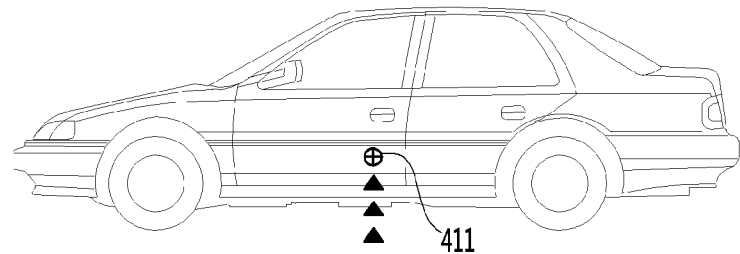
FIG. 4 is a view for explaining a principle of load movement.
Figure 4:
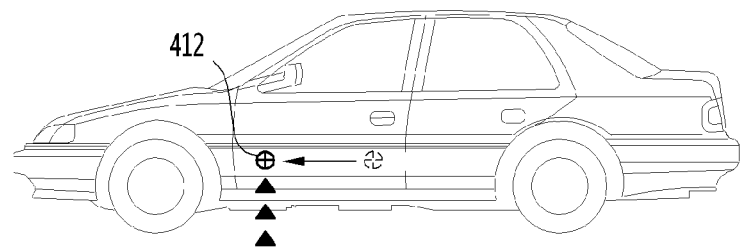
Figure 4:
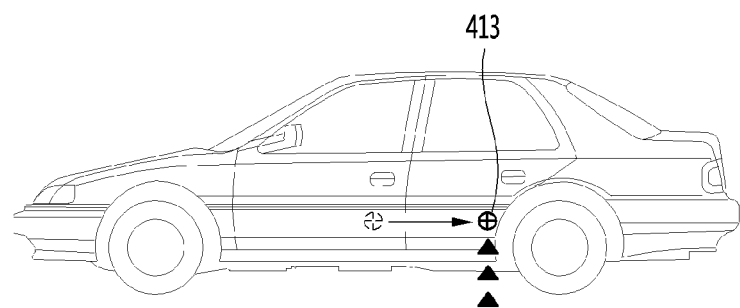

FIG. 4 is a view for explaining a principle of weight movement.

An operation point 411 of a load in the case of no acceleration or deceleration is assumed to be a center of the vehicle (FIG. 4A).

FIG. 4B is a diagram illustrating load movement when deceleration occurs. When the deceleration occurs, the operation point 412 of the load is moved forward of the vehicle.

FIG. 4C is a diagram illustrating load movement when acceleration occurs. When the acceleration occurs, the operation point 413 of the load is moved behind the vehicle.

Figure 5:
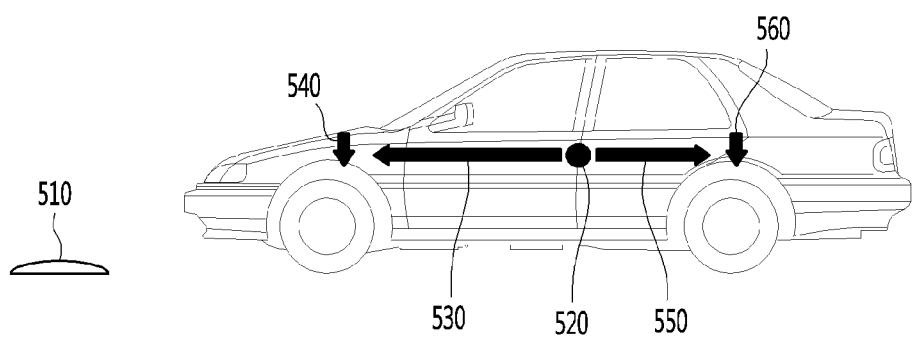
FIG. 5 is a view for explaining a load movement method using a brake and an accelerator.

FIG. 5 is a view for explaining a load movement method using the brake and the accelerator.

Since the deceleration occurs when the brake is actuated, the operation point of the load 520 of the vehicle is moved forward 530. Since the weight is loaded on the front part of the vehicle, an effect 540 of pressing the front portion of the vehicle downward occurs.

To make it easier to understand, if recalling a scene where a car brakes suddenly in a movie or drama, or a vehicle that came at high speed when crossing a pedestrian crossing, it is seen that the front of the vehicle descends and then ascends.

In contrast to the brake, since the acceleration occurs when the accelerator is activated, the operation point of the load 520 of the vehicle is moved to the rear 550. In this case, since the weight is put on the rear part of the vehicle, the effect 560 of pressing the rear part of the vehicle downward occurs.

When using this principle, it is possible to reduce the sloshing (up and down movement) of the vehicle when the vehicle passes through the speed bump 510.

For example, when the front wheel of the vehicle enters the speed bump 510, when the operation point of the load is moved forward by activating the brake, a point at which the sloshing of the vehicle occurs (a portion of the front wheel of the vehicle contacting the speed bump 510) may be pressed. Thus, the vehicle's sloshing (up and down movement) is reduced.

For another example, if the rear wheel of the vehicle enters the speed bump 510, when moving the operation point of the load backward by operating the accelerator, the point (a portion at which the vehicle and the speed bump 510 contact each other) may be pressed. Thus, the vehicle's rolling (up and down movement) is reduced.

A degree of the sloshing (up and down movement) of the vehicle may be different according to how hard you operate the accelerator or the brake at the time point at which the vehicle enters the speed bump. Thus, it is necessary to calculate the optimum braking intensity (or accelerating intensity) that is capable of minimizing the vehicle sloshing (up and down movement).

Figure 6:
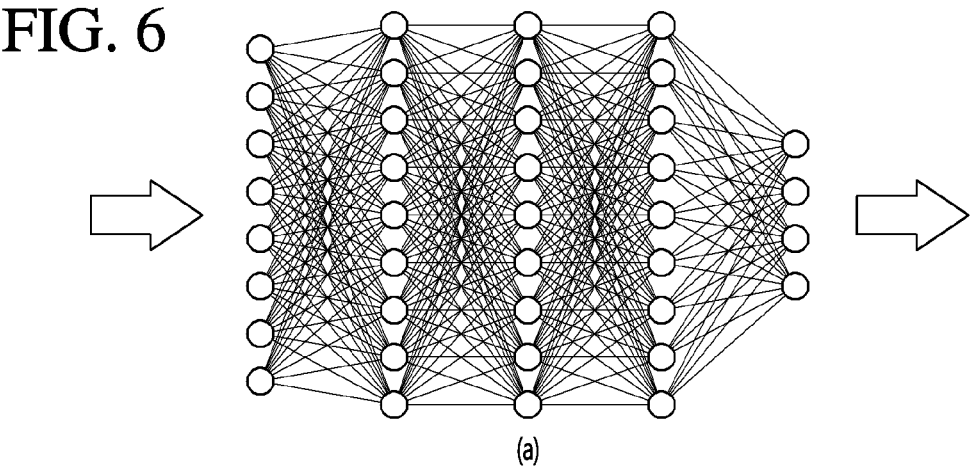
FIG. 6 is a view for explaining a method for generating a prediction model according to an embodiment of the present invention.
Figure 6:
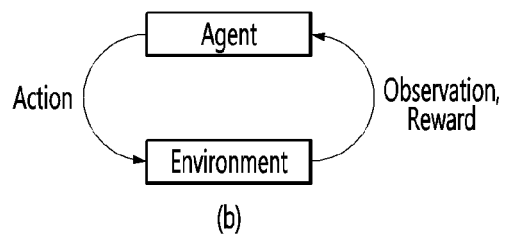
Figure 6:
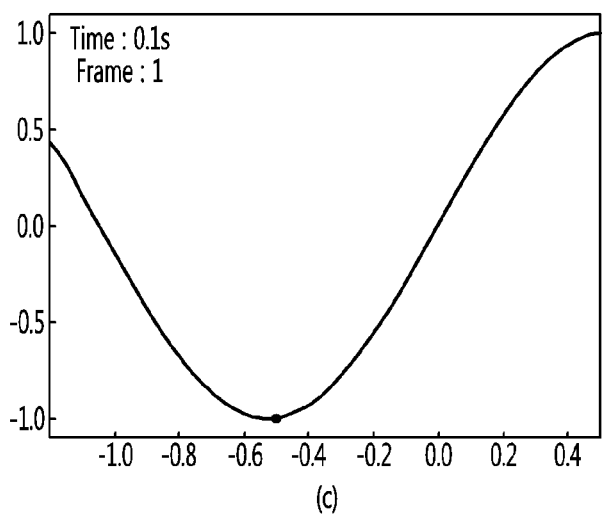

FIG. 6 is a view for explaining a method for generating a prediction model according to an embodiment of the present invention.

Since learning is performed through reinforcement learning, an artificial neural network in which parameters are determined or continuously updated may be called a reinforcement learning model in this specification. The reinforcement learning model may also be called a prediction model.

The reinforcement learning may be performed primarily by a Markov decision process (MDP).

In the Markov decision process (MDP), first, the environment, in which information necessary for the agent to perform the following actions is configured, is given; second, the agent defines how to act based on the state in the environment; third, what the agent does well to reward and if not, penalty, is defined; and fourth, the experience is repeated until the reward reaches its highest point to derive optimal policy.

When applying the Markov decision process to the present invention, an agent may represent the air conditioner, more specifically, the reinforcement learning model.

Also, first, in the present invention, an environment in which information necessary for the next action of the agent (reinforcement learning model) is configured, i.e., the vehicle sloshing (up and down movement of the vehicle) while crossing the speed bump may be given.

Also, second, the present invention may determine how the agent (reinforcement learning model) acts based on the given state (for example, at least one of the speed of the vehicle, the weight of the vehicle, or the height of the speed bumps), i.e., how the agent sets the braking intensity, accelerating intensity, or braking intensity.

Also, third, the agent (reinforcement learning model) may give the reward when there is less vehicle sloshing (up and down movement of the vehicle) and gives the penalty when there is much vehicle sloshing (up and down movement of the vehicle). In this case, the agent (reinforcement learning model) may update parameters of the neural network on the basis of the reward and the penalty.

Also, fourth, the agent (reinforcement learning model) may repeatedly experience until future reward reaches its peak, resulting in optimal policy, i.e., vehicle sloshing after entering (or passing through) the speed bumps. In order to minimize the sloshing (up and down movement) of the vehicle, it is possible to derive the braking intensity or the accelerating intensity corresponding to the speed, weight and height of the speed bump.

Meanwhile, the reinforcement learning model may be composed of the neural network, and the parameters of the reinforcement learning model, that is, the parameters of the neural network, may be updated using the feedback.

Also, as the neural network is trained, the learning results obtained using the feedback according to the actions and actions of the reinforcement learning model may be stored in the memory.

The learning results may mean parameters of the reinforcement learning model that is updated by using the feedback of the members. The learning results may form a portion of the neural network that constitutes the reinforcement learning model.

The reinforcement learning model may be generated by training the neural network in the learning device 200. Also, when the training is completed, the reinforcement learning model may be mounted on the vehicle control apparatus 100.

The reinforcement learning model may be implemented as hardware, software, or a combination of the hardware and the software. When a portion or the whole of the trained model is implemented as the software, one or more commands constituting the reinforcement learning model may be stored in the memory 170.

First, a first prediction model (first reinforcement learning model) for predicting the braking intensity when the front wheel of the vehicle enters the speed bump will be described.

The state provided to the neural network may be called a training input parameter.

The training input parameter may include a speed of the vehicle and a weight of the vehicle.

Here, the speed of the vehicle may represent a speed at which the vehicle enters the speed bump. Particularly, the speed of the vehicle may be a speed at which the front wheel of the vehicle enters the speed bump. Here, a time point when the front wheel of the vehicle enters the speed bump may represent a time point when the front wheel of the vehicle touches the speed bump.

The weight of the vehicle may include a unladen vehicle weight and an additional loading weight. Here, the unladen vehicle weight may represent a weight of the vehicle, that is, a weight of the vehicle itself when no people or objects are loaded on the vehicle. Also, the additional loading weight may represent a weight of a person or an article when the person or the article is loaded in the vehicle.

Various training input parameter may be provided to the neural network. That is, the training input parameter constituted by a combination of various vehicle speeds and various vehicle weights may be provided to the neural network.

For example, the learning device 200 may provide a first training input parameter of a speed of 30 km and a weight of 2000 kg, a second training input parameter of a speed of 30 km and a weight of 2100 kg, a third training input parameter of a speed of 30 km and a weight of 2200 kg, a fourth training input parameter of a speed of 30 km and a weight of 2300 kg, a fifth training input parameter of a speed of 20 km and a weight of 2000 kg, a sixth training input parameter of a speed of 20 km and a weight of 2100 kg, a seventh training input parameter of a speed of 50 km and a weight of 2200 kg, and an eight training input parameter of a speed of 20 km and a weight of 2300 kg to the neural network.

The speed of the vehicle included in the training input parameter may be a fixed value. Also, the training device may provide training input parameters constituted by a combination of the fixed vehicle speed and various vehicle weights to the neural network.

For example, the learning device 200 may provide the fifth training input parameter of the speed of 20 km and the weight of 2000 kg, the sixth training input parameter of the speed of 20 km and the weight of 2100 kg, the seventh training input parameter of the speed of 50 km and the weight of 2200 kg, and the eight training input parameter of the speed of 20 km and the weight of 2300 kg to the neural network.

As described above, when the training input parameter constituted by a combination of the fixed vehicle speed and the various vehicle weights are provided to the neural network, the training speed of the neural network may be faster.

The training input parameter may further include the speed of the speed bump as well as the speed of the vehicle and the weight of the vehicle.

Here, the height of the speed bump may represent a vertical height of the speed bump from the ground surface.

Also, the training input parameters constituted by various vehicle speeds, various vehicle weights, and vertical heights of various speed bumps may be provided to the neural network.

As described above, when the training input parameter includes the vertical height of the speed bumps, the prediction model may calculate the optimum braking intensity for the speed bumps having various heights.

The neural network provided with a state (training input parameter) may output an action (braking intensity) as a result based on the state.

Also, the neural network may be trained based on feedback on the braking intensity outputted by the neural network.

Here, the feedback may include the sloshing of the vehicle.

Here, the sloshing of the vehicle may represent the vertical movement of the vehicle, that is, the vertical movement from the ground surface.

Also, the sloshing of the vehicle may represent the sloshing of the vehicle after the front wheel enters the speed bump. More particularly, the sloshing of the vehicle may be the sloshing of the vehicle while the front wheel passes through the speed bump (while the front wheel is touched with the speed bump), or the peak of the speed bump after the front wheel enters the speed bump (the front wheel peak at the speed bump).

The neural network may be trained based on the feedback (sloshing of the vehicle) on the action (braking intensity).

Particularly, the neural network may be trained using at least one of the reward for the reduction of the vertical movement of the vehicle and the penalty for the increase of the vertical movement of the vehicle.

Here, the criteria for the reduction of the vertical movement may be set in various manners.

For example, if the up and down movement for the current behavior of the neural network (braking intensity) is less than the up and down movement for the previous behavior of the neural network (braking intensity), it may be determined that the up and down movement is reduced.

For another example, if the vertical movement for the current behavior (braking intensity) of the neural network is smaller than the reference value, it may be determined that the vertical movement is reduced.

Here, the criteria for increasing the vertical movement may also be set in various manners.

For example, if the up and down movement for the current behavior of the neural network (braking intensity) is greater than the up and down motion for the previous behavior of the neural network (braking intensity), it may be determined that the up and down movement increases.

For another example, if the vertical motion for the current behavior (braking intensity) of the neural network is greater than the reference value, it may be determined that the vertical movement increases.

The learning device 200 may train the neural network by using at least one of the reward for the reduction of the vertical movement and the penalty for the increase of the vertical movement.

Particularly, if the up and down movement of the vehicle when outputting a certain behavior (braking intensity) is reduced further than the up and down movement of the vehicle when outputting another behavior (braking intensity), the learning device 200 may give the reward to the neural network.

Also, if the up and down movement of the vehicle when outputting a certain behavior (braking intensity) increases more than the up and down movement of the vehicle when outputting another behavior (braking intensity), the learning device 200 may give the penalty to the neural network.

In this case, the neural network may establish a new policy on the basis of the behavior (braking intensity) outputted by the neural network, the reward, or the penalty and update the parameters of the neural network to correspond to the new policy.

The prediction model may be updated multiple times by receiving various training input parameters in order to establish an optimal policy. Here, the optimal policy may be a policy for minimizing the vertical movement of the vehicle after entering the speed bump as shown in FIG. 6C.

Also, if the training is over a certain amount, the update of the neural network is stopped, and the neural network may be mounted in the vehicle control device. As described above, the neural network trained by the training input parameters and the feedback corresponding to the training input parameters so that the internal parameters are set (updated) may be called a prediction model (or reinforcement learning model). Also, the neural network trained to predict the braking intensity may be called a first prediction model.

Next, a second prediction model (second reinforcement learning model) for predicting the accelerating intensity when the rear wheel of the vehicle enters the speed bump will be described.

The method for generating the second prediction model is similar in principle to the method for generating the first prediction model, but is different from the first prediction model in that the neural network outputs the accelerating intensity instead of the braking intensity.

The training input parameter may include a speed of the vehicle and a weight of the vehicle.

Also, various training input parameter may be provided to the second neural network. That is, the training input parameter constituted by a combination of various vehicle speeds and various vehicle weights may be provided to the second neural network.

The speed of the vehicle included in the training input parameter may be a fixed value. Also, the training device may provide training input parameters constituted by a combination of the fixed vehicle speed and various vehicle weights to the second neural network.

As described above, when the training input parameter constituted by a combination of the fixed vehicle speed and the various vehicle weights are provided to the neural network, the training speed of the neural network may be faster.

The training input parameter may further include the speed of the speed bump as well as the speed of the vehicle and the weight of the vehicle.

Also, the training input parameters constituted by various vehicle speeds, various vehicle weights, and vertical heights of various speed bumps may be provided to the second neural network.

As described above, when the training input parameter includes the vertical height of the speed bumps, the prediction model may calculate the optimum accelerating intensity for the speed bumps having various heights.

The second neural network provided with a state (training input parameter) may output an action (accelerating intensity) as a result based on the state.

Also, the neural network may be trained based on feedback on the accelerating intensity outputted by the neural network.

Here, the feedback may include the rolling of the vehicle. Here, the sloshing of the vehicle may represent the vertical movement of the vehicle, that is, the vertical movement from the ground surface.

Also, the sloshing of the vehicle may represent the sloshing of the vehicle after the rear wheel enters the speed bump. More particularly, the sloshing of the vehicle may be the sloshing of the vehicle while the rear wheel passes through the speed bump (while the rear wheel is touched with the speed bump), or the peak of the speed bump after the rear wheel enters the speed bump (the rear wheel peak at the speed bump).

The second neural network may be trained based on the feedback (sloshing of the vehicle) on the action (accelerating intensity).

Particularly, the second neural network may be trained using at least one of the reward on the reduction of the vertical movement of the vehicle or the penalty on the increase of the vertical movement of the vehicle.

Here, the criteria for the reduction of the vertical movement may be set in various ways.

For example, if the up and down movement for the current behavior of the neural network (accelerating intensity) is less than the up and down movement for the previous behavior of the neural network (accelerating intensity), it may be determined that the up and down movement is reduced.

For another example, if the vertical movement for the current behavior (accelerating intensity) of the neural network is smaller than the reference value, it may be determined that the vertical movement is reduced.

Here, the criteria for increasing the vertical movement may also be set in various ways.

For example, if the up and down movement for the current behavior of the neural network (accelerating intensity) is greater than the up and down movement for the previous behavior of the neural network (accelerating intensity), it may be determined that the up and down movement increases For another example, if the vertical motion for the current behavior (accelerating intensity) of the neural network is greater than the reference value, it may be determined that the vertical movement increases.

The learning device 200 may train the neural network by using at least one of the reward for the reduction of the vertical movement of the vehicle and the penalty for the increase of the vertical movement of the vehicle.

Particularly, if the up and down movement of the vehicle when outputting a certain behavior (accelerating intensity) is reduced further than the up and down movement of the vehicle when outputting another behavior (accelerating intensity), the learning device 200 may give the reward to the neural network.

Also, if the up and down movement of the vehicle when outputting a certain behavior (accelerating intensity) increases more than the up and down movement of the vehicle when outputting another behavior (accelerating intensity), the learning device 200 may give the penalty to the neural network.

In this case, the second neural network may establish a new policy on the basis of the behavior (accelerating intensity) outputted by the neural network, the reward, or the penalty and update the parameters of the neural network to correspond to the new policy.

The second neural network may be updated multiple times by receiving various training input parameters in order to establish an optimal policy. Here, the optimal policy may be a policy for minimizing the vertical movement of the vehicle after the rear wheel of the vehicle enters the speed bump.

Also, if the training is over a certain amount, the update of the second neural network is stopped, and the second neural network may be mounted in the vehicle control device. As described above, the second neural network trained by the training input parameters and the feedback corresponding to the training input parameters so that the internal parameters are set (updated) may be called a prediction model (or second reinforcement learning model). Also, the second neural network trained to predict the accelerating intensity may be called a second prediction model.

Actual data may be used for the training input parameters, and simulation data may be used.

Figure 7:
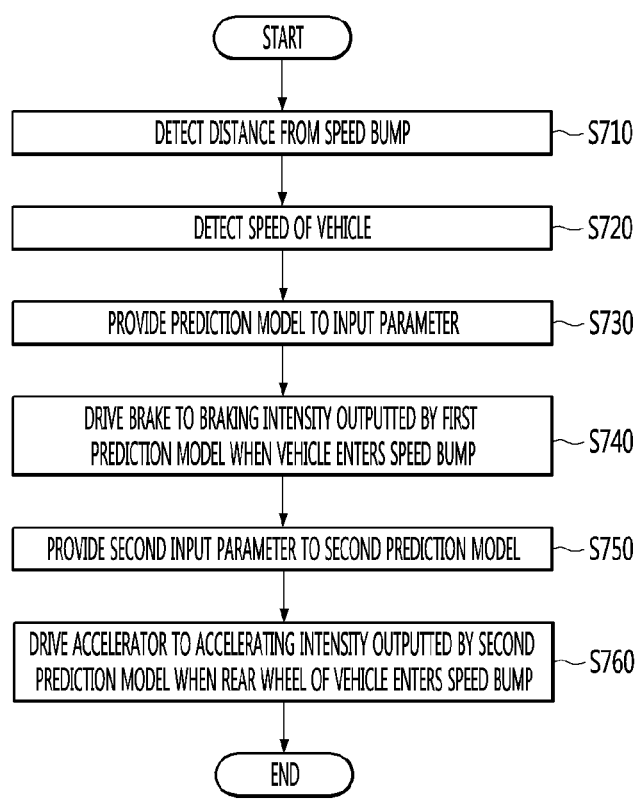
FIG. 7 is a view for explaining a method for operating a vehicle control apparatus according to an embodiment of the present invention.

FIG. 7 is a view for explaining a method for operating the vehicle control apparatus according to an embodiment of the present invention.

A method for operating a vehicle control apparatus according to an embodiment of the present invention may include a process (S710) of detecting a distance from a speed bump, a process (S720) of detecting a speed of a vehicle, a process (S730) of providing an input parameter to a prediction model, a process (S740) of controlling a vehicle driver so that a brake is driven to a braking intensity outputted by a first prediction model when the vehicle enters the speed bump on the basis of the distance from the speed bump, a process (S750) of providing a second input parameter to a second prediction model, and a process (S760) of controlling the vehicle driver so that the accelerator is driven to the accelerating intensity outputted by the second prediction model when a rear wheel of the vehicle enters the speed bump.

Figure 8:
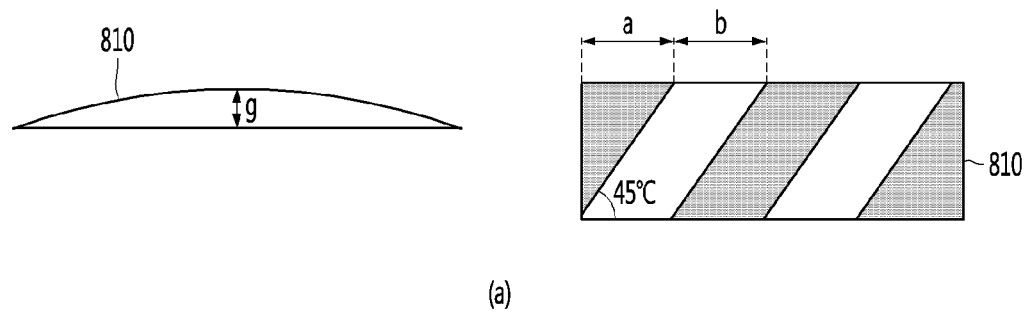
FIG. 8 is a view for explaining a method for detecting a distance from a speed bump and a height of the speed bump according to an embodiment of the present invention.
Figure 8:
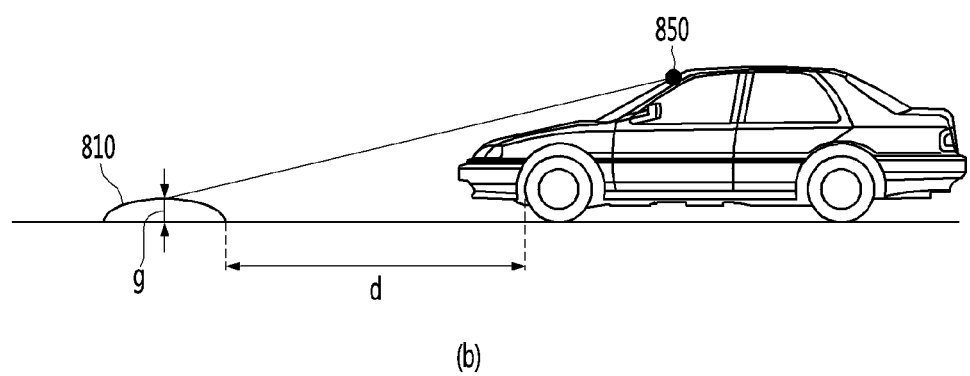

FIG. 8 is a view for explaining a method for detecting a distance from the speed bump and a height of the speed bump according to an embodiment of the present invention.

FIG. 8A illustrates a side cross-sectional view and a plan view of the speed bump 810.

The processor 180 may detect the speed bump 810 using an image acquired by a camera 850.

Particularly, the processor 180 may determine that an object included in the acquired image is the speed bump 810 by using left and right width, length, pattern, and height g of the object included in the acquired image.

For example, in traffic regulations, a pattern of the speed bump, widths a and b of the speed bump, an angle of the pattern (for example, 45 degrees), a height, a length, and the like are prescribed. Also, the processor 180 may detect the speed bump 810 by using the left and right width, the length, the pattern, and the height g of the object included in the acquired image.

Also, the processor 180 may detect a distance d to the speed bump 810 using various data obtained by a sensor unit 140.

Here, the distance to the speed bump 810 may represent a distance between a front wheel of the vehicle and the speed bump 810.

Also, the processor 180 may detect a height g of the speed bump 810 using various data obtained by the sensor unit 140. For example, the processor 180 may calculate the height g of the speed bump 810 based on the distance of the speed bump and the image of the speed bump included in the image acquired through the camera.

The processor 180 may detect the speed of the vehicle using a speed sensor.

Figure 9:
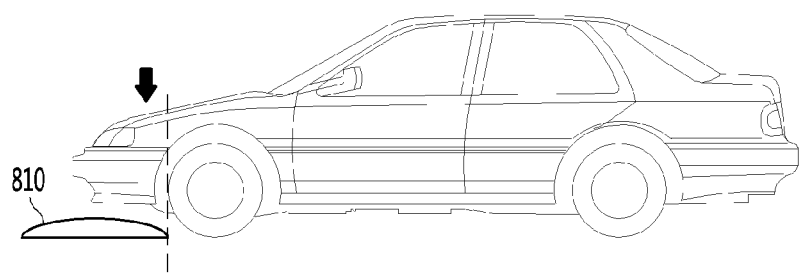
FIG. 9 is a view illustrating a time point at which the vehicle enters the speed bump.

FIG. 9 is a view illustrating a time point at which the vehicle enters the speed bump.

Here, the time point when the vehicle enters the speed bump may represent a time point when the front wheel of the vehicle enters the speed bump.

The processor 180 may calculate the time point at which the vehicle enters the speed bump.

Particularly, the processor 180 may calculate the time point at which the vehicle enters the speed bump based on the distance to the speed bump and the speed of the vehicle.

In other manners, the processor 180 may calculate the rotation speed of the wheel until the front wheel of the vehicle enters the speed bump based on the distance to the speed bump. When the wheel is rotated by the calculated by number of revolutions, the processor 180 may determine that the front wheel of the vehicle enters the speed bump. The sensing unit 140 may include a PWM sensor for detecting the rotation speed of the wheel.

The processor 180 may provide an input parameter including a speed and weight of the vehicle to the first prediction model.

Here, the speed of the vehicle may represent the speed at which the vehicle enters the speed bump, more specifically, the speed at which the front wheel of the vehicle enters the speed bump.

Since there is a processing time (delay) of the first prediction model, the speed of the vehicle substantially provided to the second prediction model may be a speed that is a predetermined time earlier than the time when the front wheel of the vehicle enters the speed bump.

Also, in the present invention, the "speed at which the front wheel of the vehicle enters the speed bump" may represent the speed at which the processing time (delay) of the first prediction model is considered.

An unladen vehicle weight of the vehicle may be pre-stored in the memory of the vehicle control apparatus.

Also, a pressure sensor may be installed in chairs and a trunk of the vehicle. The processor may calculate an additional loading weight on the basis of data obtained from the pressure sensor.

Also, the processor may calculate a weight of the vehicle by summing the additional loading weight and the unladen vehicle weight.

When an input parameter including the speed and weight of the vehicle is provided, the first prediction model may output a braking intensity.

Also, when the vehicle enters the speed bump, the processor 180 may drive the brake with the braking intensity outputted by the first prediction model.

Particularly, when the front wheel of the vehicle enters the speed bump, the processor may control the vehicle driver to drive the brake with the braking intensity outputted by the first prediction model.

When the front wheel of the vehicle enters the speed bump, the driving of the brake with the braking intensity outputted by the first prediction model may represent that the brake is driven when the front wheel of the vehicle touches the speed bump.

However, the present invention is not limited thereto. The driving of the braking intensity outputted by the first prediction model may represent that the brake is driven before or after a predetermined time at the moment at which the front wheel of the vehicle touches the speed bump.

The vehicle driver may control the operation of the brake using the braking intensity outputted by the first prediction model.

The first prediction model is a neural network that has been pre-trained to establish an optimal policy. Thus, the prediction model may calculate an optimal action (braking intensity) that is capable of minimizing sloshing of the vehicle on the basis of the current state (the weight and speed of the vehicle).

Thus, there is an advantage that the sloshing of the vehicle is minimized, a comfortable ride to the occupants is provided.

The input parameter may further include a height of the speed bump.

Particularly, the height of the speed bumps may be specified in traffic regulations. Thus, under the premise that the height of the speed bumps is a fixed value, the neural network may be trained using a training input parameter including the speed of the vehicle and the weight of the vehicle to generate a first prediction model.

In this case, the input parameter including the speed of the vehicle and the weight of the vehicle is provided to the first prediction model, and the first prediction model may output the braking intensity by using the speed of the vehicle and the weight of the vehicle on the premise that the height of the speed bumps is a fixed value.

However, the speed bump may also be installed that are against the law. Therefore, the above-described embodiment has also been described in which the training input parameter includes not only the speed of the vehicle and the weight of the vehicle but also the height of the speed bump.

Also, when the first prediction model is generated using training input data including the speed of the vehicle, the weight of the vehicle, and the height of the speed bump, the input parameter provided to the first prediction model may include the speed of the vehicle, the weight of the vehicle, and the like.

Particularly, the processor 180 may provide an input parameter including the height of the speed bump, the speed and the weight of the vehicle to the first prediction model.

Also, if the input parameter including the height of the speed bump, the speed and weight of the vehicle is provided, the first prediction model may output the braking intensity. Also, when the vehicle enters the speed bump, the processor 180 may drive the brake with the braking intensity outputted by the prediction model.

The first prediction model is a neural network that has been pre-trained to establish an optimal policy. Thus, the first prediction model may calculate an optimal action (braking intensity) that is capable of minimizing sloshing of the vehicle on the basis of the current state (the height of the speed bump and the weight and speed of the vehicle).

Thus, with respect to the speed bumps having various heights, there is an advantage of minimizing the sloshing of the vehicle and providing a comfortable ride to the occupants.

The speed of the vehicle included in the input parameter may be a fixed value.

Particularly, when the speed bump is detected, the processor 180 may control the operation of the brake or the operation of the accelerator to have the fixed vehicle speed when the front wheel of the vehicle enters the speed bump. Here, the fixed vehicle speed may be the same as the fixed vehicle speed previously included in the training input parameter.

For example, the first prediction model was trained using the training input parameter constituted by a combination of fixed vehicle speed (15 km) and various vehicle weights. In this case, when the speed bump is detected, the processor 180 may control the operation of the brake or the operation of the accelerator so that the vehicle enters the speed bump at a speed of 15 km.

In this case, the input parameter including the fixed speed of the vehicle and the weight of the vehicle is provided to the first prediction model, and the first prediction model may output the braking intensity by using the fixed speed of the vehicle and the weight of the vehicle.

Also, when the vehicle enters the speed bump at the fixed speed, the processor 180 may drive the brake with the braking intensity outputted by the prediction model.

The first prediction model is a neural network that has been pre-trained to establish an optimal policy. Thus, the first prediction model may calculate an optimal action (braking intensity) that is capable of minimizing sloshing of the vehicle on the basis of the current state (the fixed speed of the vehicle, the weight of the vehicle, or the fixed speed of the vehicle, the weight of the vehicle, and the height of the speed bump).

That is, when entering the speed bump, it is possible to reduce the speed of the vehicle to prevent damage to the vehicle, promote pedestrian safety, and reduce the amount of training data by training using the fixed vehicle speed.

Figure 10:
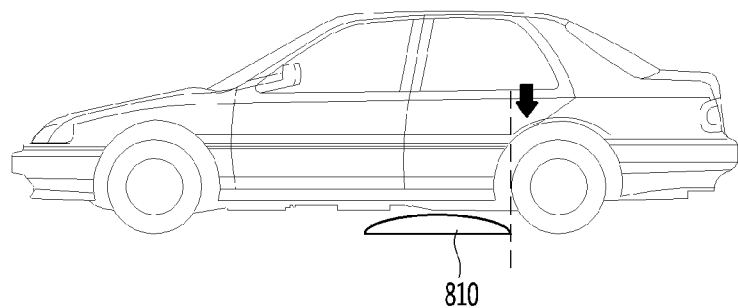
FIG. 10 is a view illustrating a time point at which a rear wheel of the vehicle enters the speed bump.

FIG. 10 is a view illustrating a time point at which the rear wheel of the vehicle enters the speed bump.

The processor 180 may calculate the time point at which the rear wheel of the vehicle enters the speed bump.

Particularly, the processor 180 may calculate a time point when the rear wheel of the vehicle enters the speed bump on the basis of the time point when the front wheel of the vehicle enters the speed bump, the distance between the front wheel and the rear wheel of the vehicle, and the speed of the vehicle.

In other manners, the processor 180 may calculate the rotation speed of the rear wheel until the rear wheel of the vehicle enters the speed bump based on the distance to the speed bump. When the rear wheel is rotated by the calculated by number of revolutions, the processor 180 may determine that the rear wheel of the vehicle enters the speed bump. The sensing unit 140 may include a PWM sensor for detecting the rotation speed of the wheel.

The processor 180 may provide an input parameter including a speed and weight of the vehicle to the second prediction model.

Here, the speed of the vehicle may represent a speed at which the rear wheel of the vehicle enters the speed bump. The speed at which the rear wheel of the vehicle enters the speed bump may called a second speed.

Since there is a processing time (delay) of the second prediction model, the speed of the vehicle substantially provided to the second prediction model may be a speed that is a predetermined time earlier than the time when the rear wheel of the vehicle enters the speed bump.

Also, in the present invention, the "speed at which the rear wheel of the vehicle enters the speed bump" may represent the speed at which the processing time (delay) of the second prediction model is considered.

When a second input parameter including the second speed and weight of the vehicle is provided, the second prediction model may output an accelerating intensity.

Also, when the rear wheel of the vehicle enters the speed bump, the processor 180 may drive the accelerator with the accelerating intensity outputted by the second prediction model.

Particularly, when the rear wheel of the vehicle enters the speed bump, the processor may control the vehicle driver to drive the accelerator with the accelerating intensity outputted by the second prediction model.

When the rear wheel of the vehicle enters the speed bump, the driving of the accelerator with the accelerating intensity outputted by the second prediction model may represent that the accelerator is driven when the rear wheel of the vehicle touches the speed bump.

However, the present invention is not limited thereto. The driving of the accelerating intensity outputted by the second prediction model may represent that the accelerator is driven before or after a predetermined time at the moment at which the rear wheel of the vehicle touches the speed bump.

The vehicle driver may control the operation of the accelerator using the accelerating intensity outputted by the second prediction model.

The second prediction model is a neural network that has been pre-trained to establish an optimal policy. Thus, the second prediction model may calculate an optimal action (accelerating intensity) that is capable of minimizing sloshing of the vehicle on the basis of the current state (vehicle weight and speed).

Thus, there is an advantage that the sloshing of the vehicle is minimized, a comfortable ride to the occupants is provided.

The input parameter may further include a height of the speed bump.

Particularly, when the second prediction model is generated using training input data including the speed of the vehicle, the weight of the vehicle, and the height of the speed bump, the input parameter provided to the second prediction model may include the speed of the vehicle, the weight of the vehicle, and the like.

Also, the processor 180 may provide an input parameter including the height of the speed bump, the speed and the weight of the vehicle to the second prediction model.

Also, if the input parameter including the height of the speed bump, the speed and weight of the vehicle is provided, the second prediction model may output the accelerating intensity. Also, when the rear wheel of the vehicle enters the speed bump, the processor 180 may drive the accelerator with the accelerating intensity outputted by the second prediction model.

The second prediction model is a neural network that has been pre-trained to establish an optimal policy. Thus, the second prediction model may calculate an optimal action (accelerating intensity) that is capable of minimizing sloshing of the vehicle on the basis of the current state (the height of the speed bump and the weight and speed of the vehicle).

Thus, with respect to the speed bumps having various heights, there is an advantage of minimizing the sloshing of the vehicle and providing a comfortable ride to the occupants.

The speed of the vehicle included in the input parameter may be a fixed value.

Particularly, when the speed bump is detected, the processor 180 may control the operation of the brake or the operation of the accelerator to have the fixed vehicle speed when the rear wheel of the vehicle enters the speed bump. Here, the fixed vehicle speed may be the same as the fixed vehicle speed previously included in the training input parameter.

In this case, the input parameter including the fixed speed of the vehicle and the weight of the vehicle is provided to the first prediction model, and the first prediction model may output the accelerating intensity by using the fixed speed of the vehicle and the weight of the vehicle.

Also, when the rear wheel of the vehicle enters the speed bump at the fixed speed, the processor 180 may drive the accelerator with the accelerating intensity outputted by the second prediction model.

The second prediction model is a neural network that has been pre-trained to establish an optimal policy. Thus, the second prediction model may calculate an optimal action (accelerating intensity) that is capable of minimizing sloshing of the vehicle on the basis of the current state (the fixed speed of the vehicle, the weight of the vehicle, or the fixed speed of the vehicle, the weight of the vehicle, and the height of the speed bump).

That is, when entering the speed bump, it is possible to reduce the speed of the vehicle to prevent damage to the vehicle, promote pedestrian safety, and reduce the amount of training data by training using the fixed vehicle speed.

Next, a method the generating the prediction model by the learning apparatus will be described.

A method for generating a prediction model includes a process of providing a training input parameter, which includes a speed and a weight of a vehicle, to a neural network, a process of acquiring feedback on a braking intensity when the neural network outputs the braking intensity; and a process of training the neural network in a reinforcement learning manner on the basis of the feedback, In this case, the feedback may be vertical movement after the vehicle enters the speed bump.

In this case, the weight of the vehicle may include an unladen vehicle weight and an additional loading weight of the vehicle.

The training input parameter may further include a height of the speed bump.

The method for generating the prediction model according to the present invention may include a process of providing a second training input parameter, which includes the speed and the weight of the vehicle, to a second neural network, a process of acquiring second feedback on an accelerating intensity when the second neural network outputs the acceleration intensity, and a process of training the second neural network in a reinforcement learning manner on the basis of the second feedback.

In this case, the second feedback may be vertical movement after a rear wheel of the vehicle enters a speed bump.

The above-described present invention may be implemented as a computer-readable code on a computer-readable medium in which a program is stored. The computer readable recording medium includes all types of recording devices in which data readable by a computer system is stored. Examples of the computer-readable recording medium include hard disk drives (HDD), solid state disks (SSD), silicon disk drives (SDD), read only memories (ROMs), random access memories (RAMs), compact disc read only memories (CD-ROMs), magnetic tapes, floppy discs, and optical data storage devices. Also, the computer may include a control unit 180 of the terminal. Thus, the detailed description is intended to be illustrative, but not limiting in all aspects. It is intended that the scope of the present invention should be determined by the rational interpretation of the claims as set forth, and the modifications and variations of the present invention come within the scope of the appended claims and their equivalents.

What is claimed is:

1. A vehicle control apparatus comprising:
   a distance sensor configured to sense a distance from a speed bump;
   a speed sensor configured to sense a speed of a vehicle;
   a vehicle driver configured to control an operation of a brake or an operation of an accelerator; and
   a processor configured to provide an input parameter comprising a speed and a weight of the vehicle and a height of the speed bump to a prediction model and control the vehicle driver so that the brake is operated at a braking intensity outputted from the prediction model when the vehicle enters the speed bump on the basis of the distance from the speed bump,
   wherein the prediction model is generated based on reinforcement learning by allowing a neural network to receive a training input parameter so as to output the braking intensity and to be trained based on feedback on the braking intensity outputted by the neural network,
   wherein the training input parameter comprises the speed of the vehicle, the weight of the vehicle, and a height of the speed bump,
   wherein the feedback relates to vertical movement of the vehicle after the vehicle enters the speed bump,
   wherein training the prediction model based on the feedback comprises training the neural network using a reward on a reduction of the vertical movement of the vehicle and penalty on an increase of the vertical movement of the vehicle, and
   wherein the prediction model acquires policy for minimizing the vertical movement of the vehicle after entering the speed bump.

2. The vehicle control apparatus according to claim 1, wherein the processor operates the brake at the braking intensity outputted from the prediction model when a front wheel of the vehicle enters the speed bump.

3. The vehicle control apparatus according to claim 1, wherein the input parameter comprises the weight comprising an unladen vehicle weight and an additional loading weight.

4. The vehicle control apparatus according to claim 1, wherein the processor is configured to control the vehicle driver configured to provide a second input parameter comprising a second speed and the weight of the vehicle to a second prediction model and operate the accelerator at an acceleration intensity outputted from the second prediction model when a rear wheel of the vehicle enters the speed bump.

5. The vehicle control apparatus according to claim 4, wherein the second prediction model is generated by, based on reinforcement learning, allowing a second neural network to receive a training input parameter so as to output the acceleration intensity and to be trained based on second feedback on the acceleration intensity outputted by the second neural network,
wherein the training input parameter comprises at least one of the speed of the vehicle, the weight of the vehicle, or a height of the speed pump, and
the second feedback is vertical movement after the rear wheel of the vehicle enters the speed bump.

6. The vehicle control apparatus according to claim 5, wherein the second prediction model is generated by allowing the second neural network to be trained using at least one of reward on the reduction of the vertical movement of the vehicle or penalty on the increase of the vertical movement of the vehicle.

7. The vehicle control apparatus according to claim 6, wherein the second prediction model acquires second policy for minimizing the vertical movement of the vehicle after the rear wheel enters the speed bump.

8. A method for generating a prediction model, the method comprising:
providing a training input parameter, which comprises a speed and a weight of a vehicle and a height of a speed bump to a neural network;
acquiring feedback on a braking intensity wherein the braking intensity is output by the neural network based on the training input parameter; and
training the neural network in a reinforcement learning manner on the basis of the feedback,
wherein the feedback relates to vertical movement of the vehicle after the vehicle enters the speed bump,
wherein training the neural network based on the feedback uses a reward on a reduction of the vertical movement of the vehicle and penalty on an increase of the vertical movement of the vehicle, and
wherein the prediction model acquires policy for minimizing the vertical movement of the vehicle after entering the speed bump.

9. The method according to claim 8, wherein the weight of the vehicle comprises an unladen vehicle weight and an additional loading weight.

10. The method according to claim 8, further comprising:
providing a second training input parameter, which comprises the speed and the weight of the vehicle, to a second neural network;
acquiring second feedback on an acceleration intensity when the second neural network outputs the acceleration intensity; and
training the second neural network in a reinforcement learning manner on the basis of the second feedback,
wherein the second feedback is vertical movement after a rear wheel of the vehicle enters a speed bump.

* * * * *